G. O. DEGENER.
COMBINED TYPE WRITING AND COMPUTING MACHINE.
APPLICATION FILED MAR. 10, 1913.
1,261,107.
Patented Apr. 2, 1918.
8 SHEETS—SHEET 1.
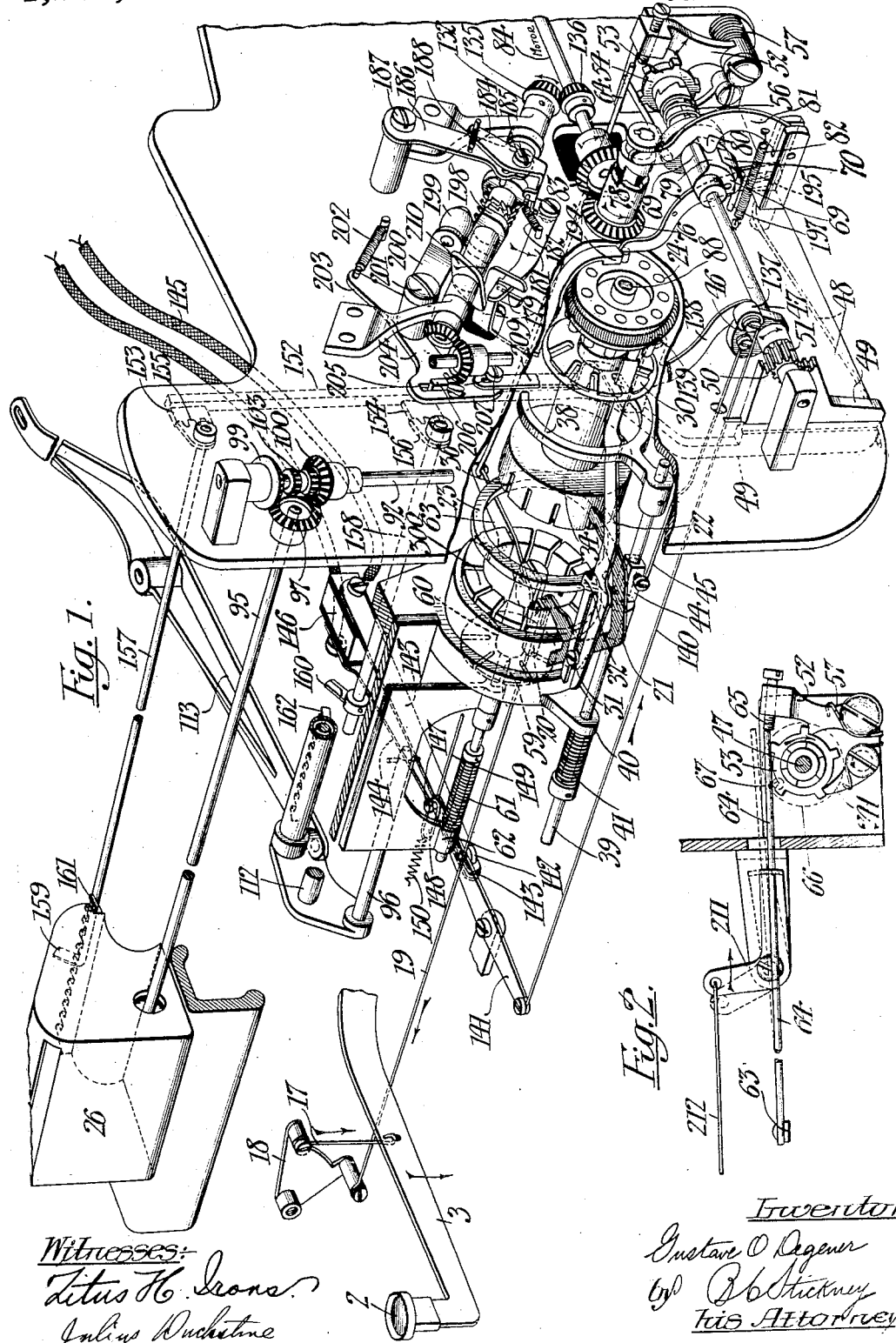

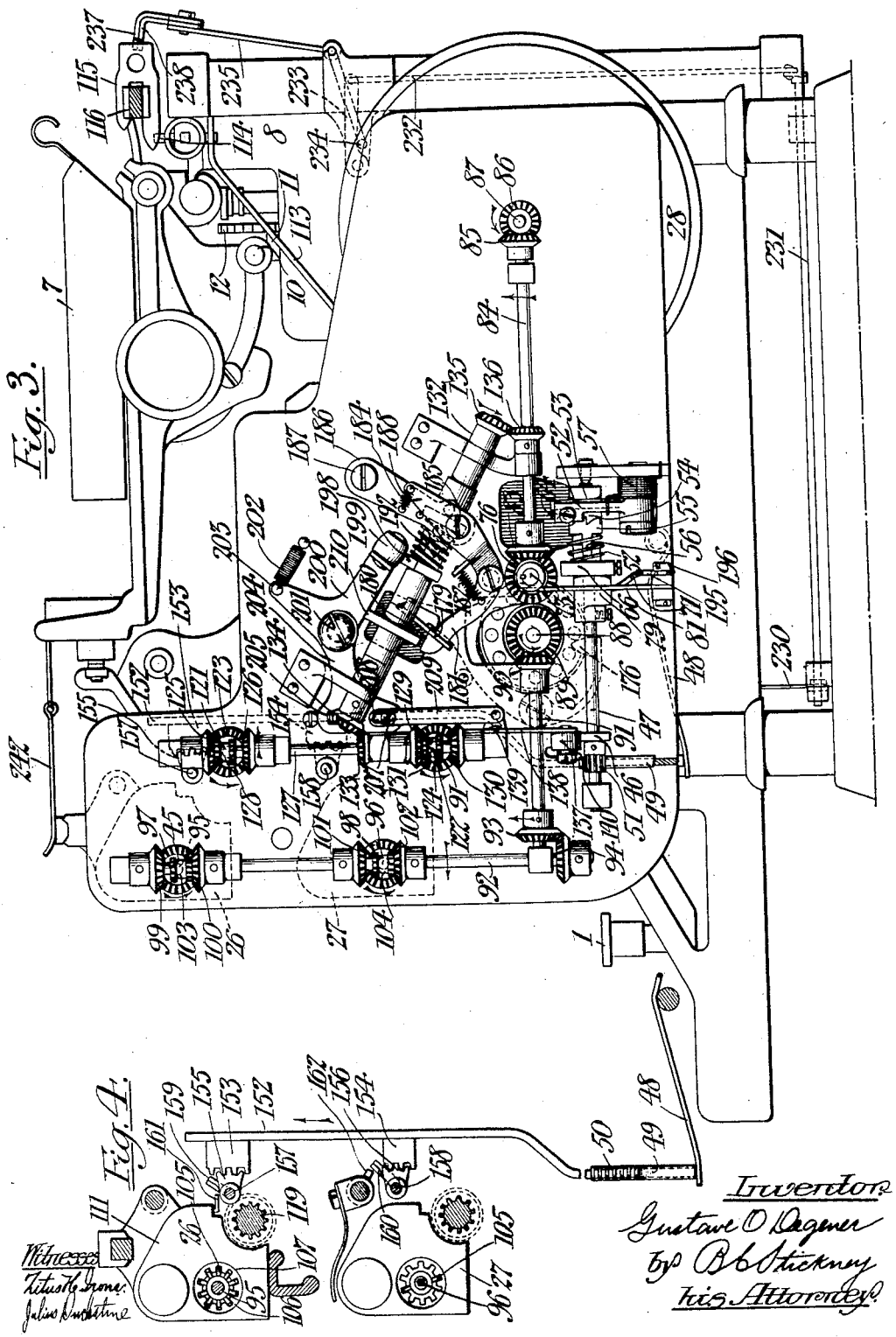

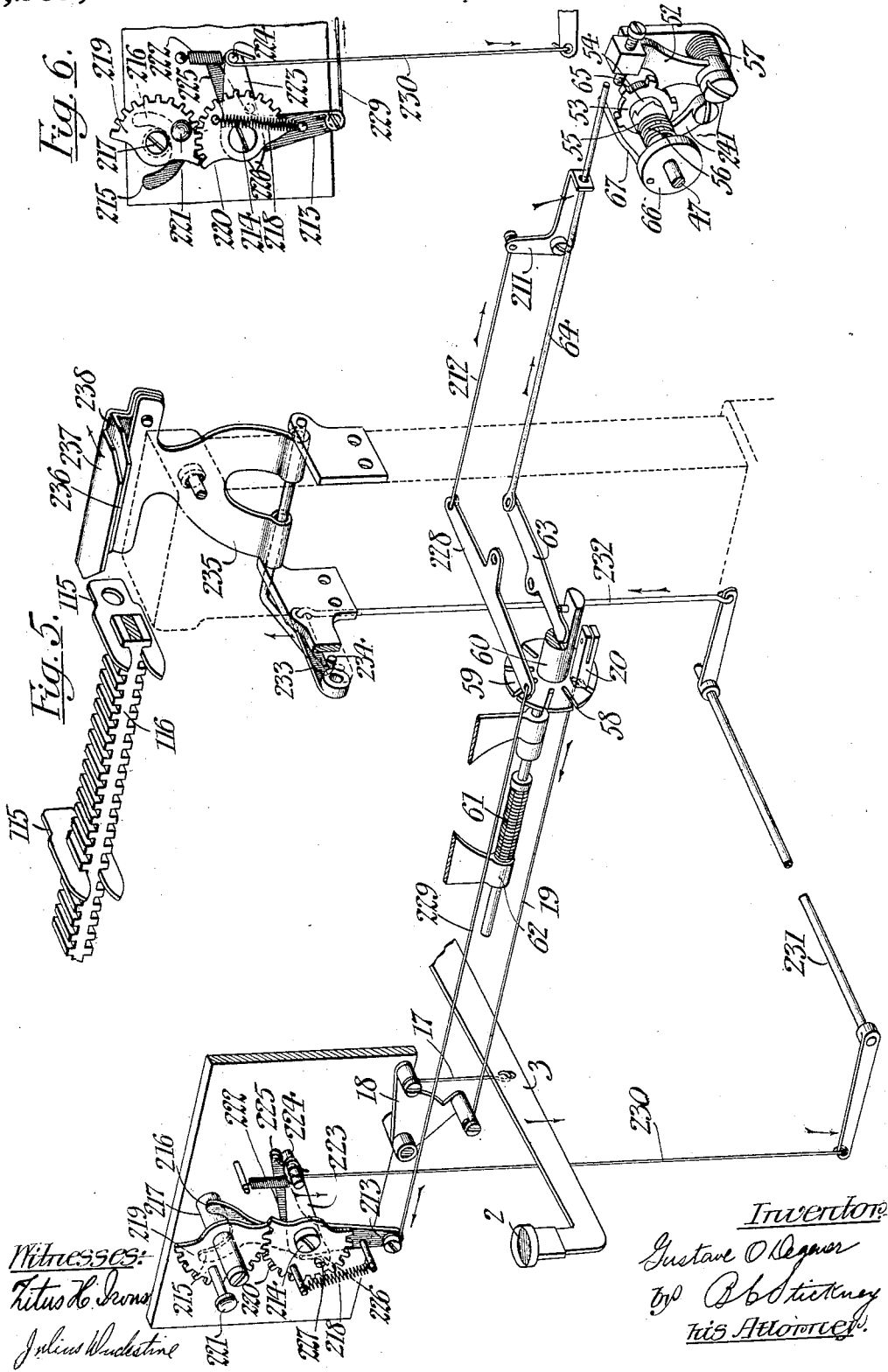

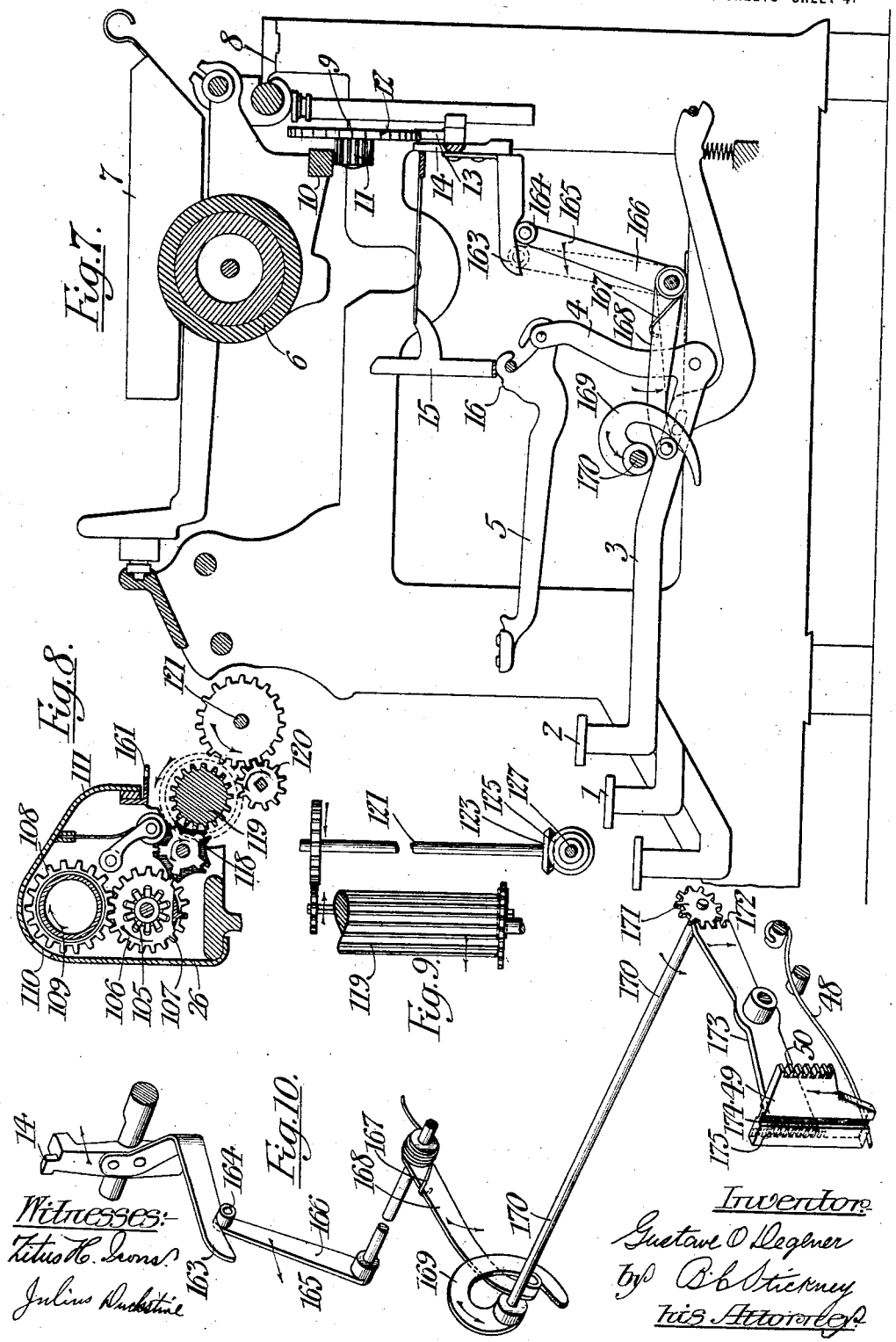

G. O. DEGENER.
COMBINED TYPE WRITING AND COMPUTING MACHINE.
APPLICATION FILED MAR. 10, 1913.
1,261,107.
Patented Apr. 2, 1918.
8 SHEETS—SHEET 5.
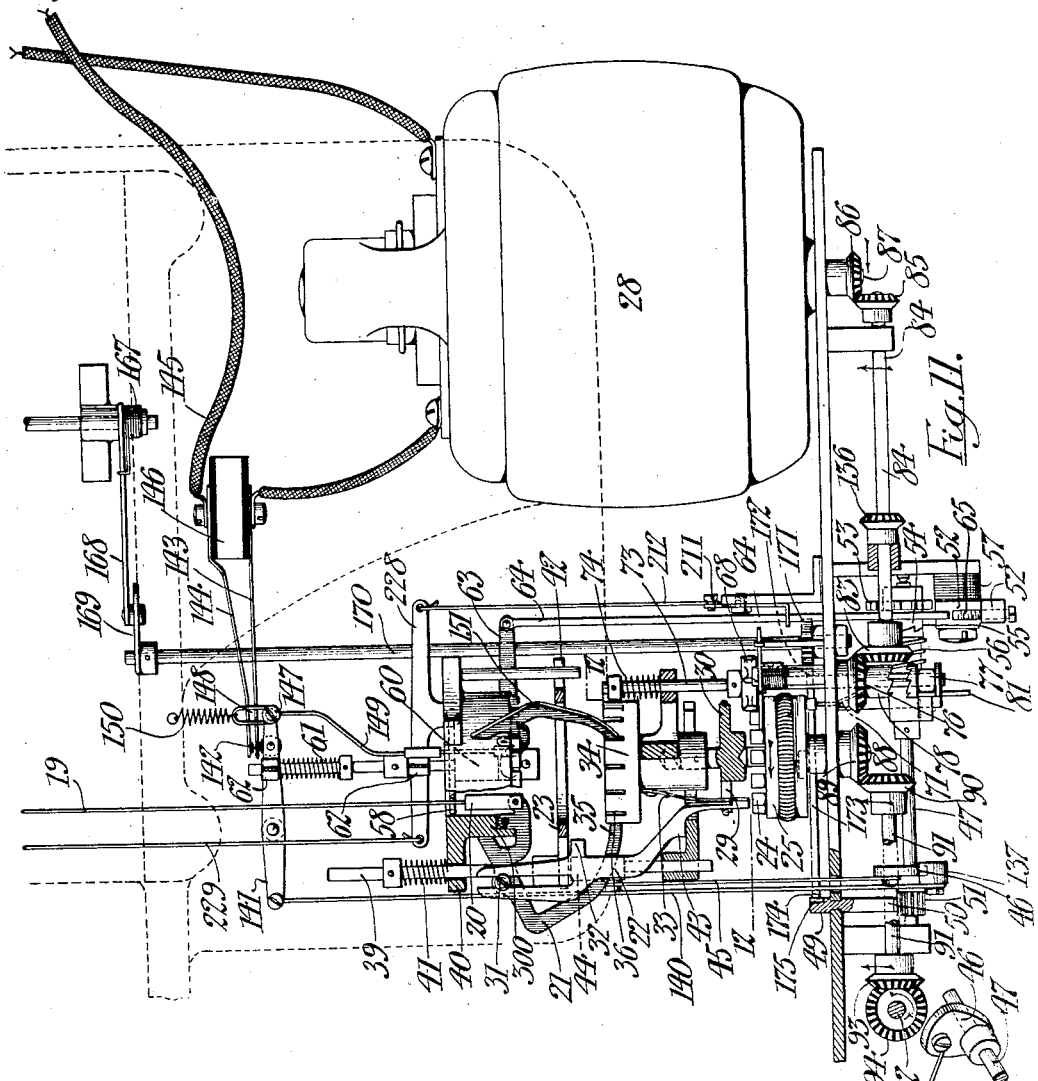
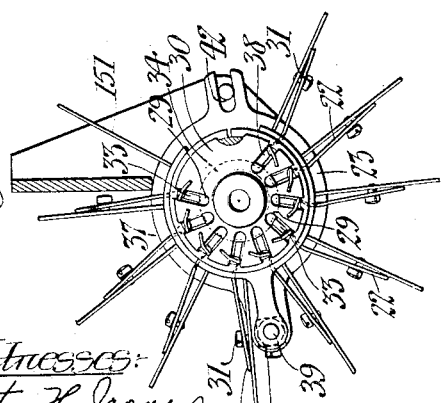
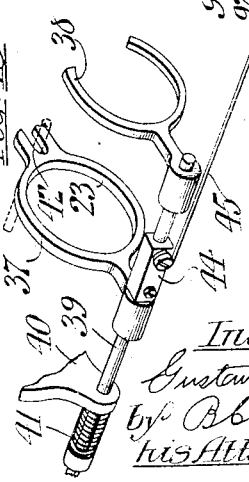

G. O. DEGENER.
COMBINED TYPE WRITING AND COMPUTING MACHINE.
APPLICATION FILED MAR. 10, 1913.
1,261,107.
Patented Apr. 2, 1918.
8 SHEETS—SHEET 6.
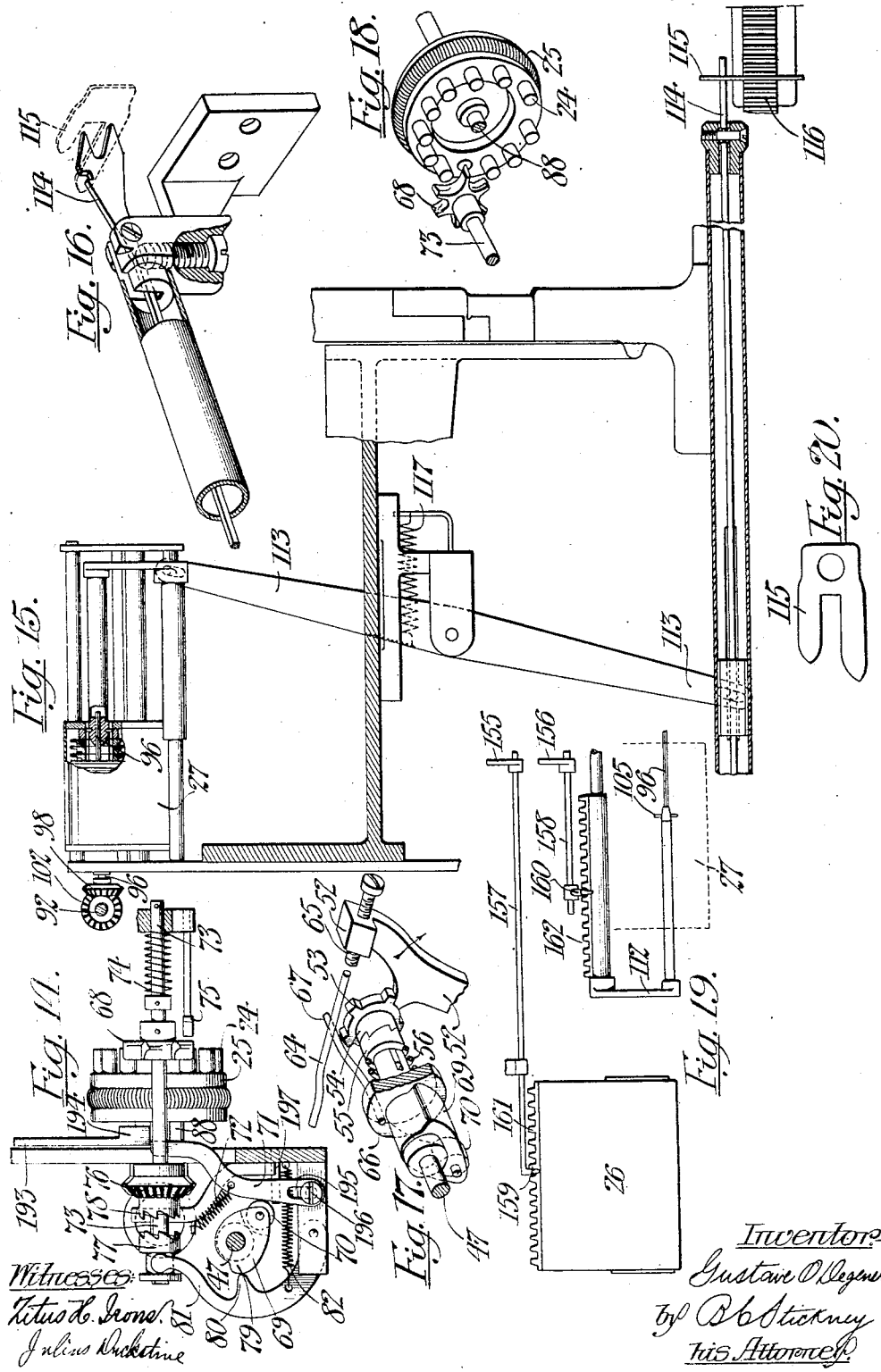

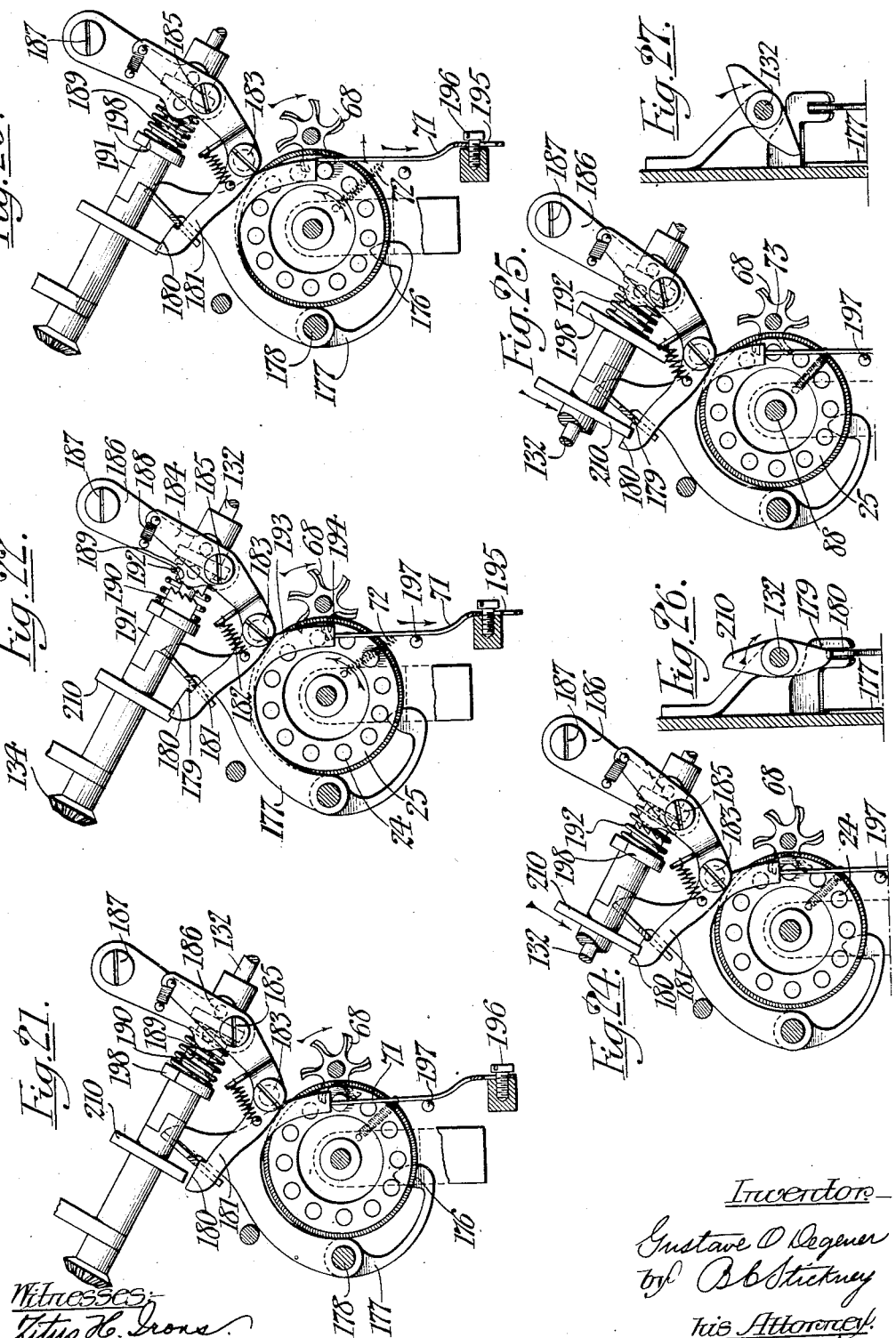

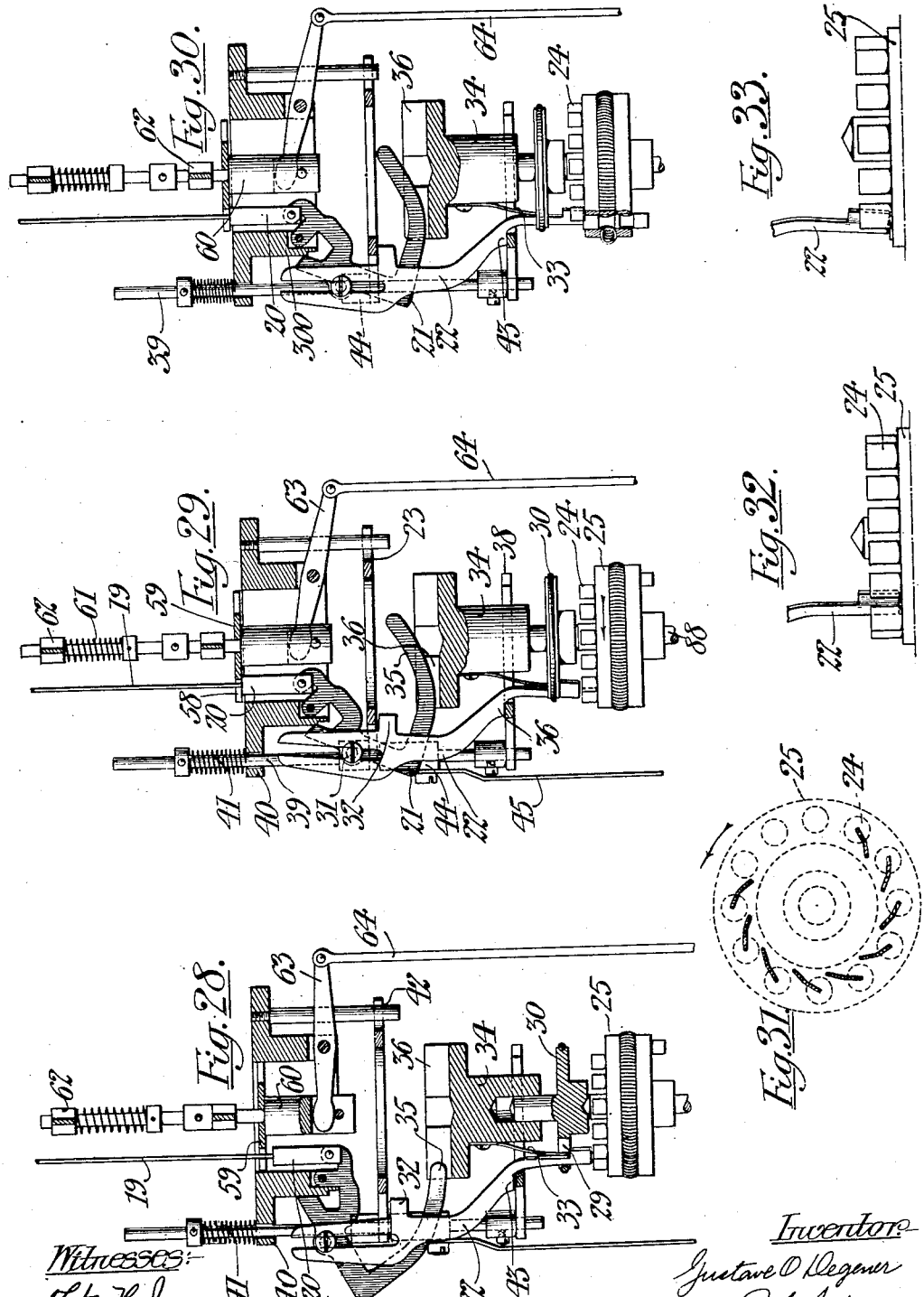

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,261,107.  Specification of Letters Patent.  Patented Apr. 2, 1918.

Application filed March 10, 1913. Serial No. 753,254.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to a combined typewriting and computing machine of the general type in which a typewriting and computing action can be carried on concomitantly under the control of a single set of numeral keys, and is an improvement on my application, Serial No. 728,803, filed October 31, 1912.

In the general type of machines on which this is an improvement, the numeral keys when actuated operate type actions to print the numbers, and, at the same time, enable the setting of index pins in a valuating mechanism to determine the extent of rotation of the computing wheels of one or more computing heads by a source of power, to correspond with the particular numeral keys struck.

In prior types of machines of this character, the numeral keys actually perform the work of setting the index pins. In the present case, however, the numeral keys are merely used to select the particular pin to be set, and are connected to bring into play automatic power-actuated mechanism for performing the actual work of setting the pins, and thus relieving the numeral keys of this burden. By this means also, the numeral keys can be freely actuated without actually setting the index pins, unless the source of power mentioned is brought into play.

Heretofore the control of the effectiveness of the numeral keys to govern the action of the computing mechanism has been controlled by the connection and disconnection of each and every numeral key to and from the computing mechanism. This was, in certain instances, controlled automatically from the carriage. In the present case, the operative effectiveness of the numeral keys to set in motion the computing mechanism, is governed by the carriage-controlled shifting between effective and ineffective positions, of a light tripper which is universally actuable by all of the numeral keys. This tripper controls the bringing into play of the source of power above-mentioned, so that when the tripper is in its ineffective position, the source of power will not be effective to set the pins, and, hence, the numeral keys may be actuated without bringing the computing mechanism into action. The effectiveness of the tripper is governed from the carriage by automatic mechanism acting to determine computing zones, which in turn may be silenced or rendered effective at will by manual controlling means.

When a numeral key is actuated to start the running up of a number on one or more computing heads, it is essential that the traveling elements of the computing heads, such as the master wheel or the set of computing wheels, should be locked against travel to prevent an incorrect or disrupting action. It is likewise advisable to lock the typewriter carriage, which controls, in a way, the movement of the traveling elements of the computing heads. Hence in this invention, means is provided which is brought into play automatically at the striking of a numeral key, for locking the traveling elements of the computing heads and the traveling typewriter carriage against a feeding movement. Further, in order that other numeral keys may not be actuated to start a new computation until the computation under way is completed, there is provided, in this case, a locking mechanism which positively prevents any of the numeral keys from being actuated until the running up of a number on the computing heads when once started, is entirely completed. This applies not only to the other numeral keys but also to the one just struck, as the locking means is supplementary to the locking means connected to each numeral key, taking the place of the same just as soon as the numeral key is returned to its normal position, and remaining in action until the current computing action taking place ceases.

Other features and advantages will hereinafter appear.

In the accompanying drawings—

Figure 1 is a skeleton perspective view showing the general connection of one of the numeral keys to the valuating mechanism and the means for actuating the same.

Fig. 2 is a detail vertical section showing the relation of the tripper to the locking dog for the supplementary source of power, the tripper being shown in the act of disconnecting the dog from its ratchet wheel to permit a rotation of the latter. The tripper is shown in dotted lines shifted to its ineffective position wherein it may be vibrated freely without effecting a disconnection of the locking dog from its detent or ratchet wheel.

Fig. 3 is a view in side elevation showing the general driving train from the motor to the master wheels and tens-carrying mechanisms of the computing heads, together with the means for storing energy in the supplementary source of power which starts the computing mechanism in action after a numeral key has been struck to bring the same into play.

Fig. 4 is a vertical skeleton section showing the relation of the locking means for preventing a travel of the traveling elements of the computing heads, so that the latter will not have a feeding movement while the computing action is going on.

Fig. 5 is a skeleton perspective view showing the automatic and manual means for controlling the effectiveness of the numeral keys to actuate the computing mechanism to compute. The manual portion of this controlling means is shown adjusted to such a position that the automatic carriage-controlled means can be effective to permit the numeral keys to start the computing mechanism when the carriage is in a computing column or zone.

Fig. 6 is a detail view in front elevation of a portion of the controlling mechanism shown in Fig. 5, showing it shifted to such a position that the automatic part thereof will be ineffective to enable the numeral keys to govern the action of the computing mechanism.

Fig. 7 is a vertical section taken from front to rear of the machine, with parts omitted for the sake of simplicity, and showing the general type action with its relation to the carriage, and also showing the means for preventing the traveling movement of the carriage while a computing action is going on.

Fig. 8 is a vertical section through one of the computing heads taken from front to rear.

Fig. 9 is a fragmentary plan view of a portion of the tens-carrying gearing for carrying over tens from computing wheels of lower denomination to computing wheels of higher denomination.

Fig. 10 is a skeleton perspective view of the mechanism for locking the carriage against a traveling movement while a computing action is going on.

Fig. 11 is a skeleton plan view, partly in section, of the right-hand end of the machine, and showing the valuating mechanism including the index wheel with its settable index pins and the means for selecting and setting the pins to determine the extent of rotation of the computing wheels.

Fig. 12 is an end view in elevation showing the cluster of selectors with the interponents which are positioned thereby to enable the setting of the index pins.

Fig. 13 is a fragmentary perspective view showing the means for supporting the floating interponents with the universal hammer or striker for actuating the interponents.

Fig. 14 is a rear view in elevation showing the relation of the index wheel to the spur wheel for driving the same and the clutching mechanism for connecting the spur wheel in driven relation with the motor.

Fig. 15 is a horizontal section with parts broken away to show the underlying structure, and disclosing the relation of one of the traveling elements of a computing head, in this instance, the master wheel to the carriage, whereby the master wheel is given a step-by-step movement through the successive wheels of the computing head.

Fig. 16 is a detail perspective view showing the arrangement of the vibrating lever shown in Fig. 15, whereby the latter is actuated from one of the tappets on the carriage.

Fig. 17 is a fragmentary perspective view showing the controlling means, which governs the bringing into play of the auxiliary source of power, which enables the setting of the pins selected by the numeral keys.

Fig. 18 is a detail perspective view showing the relation of the valuating pin-wheel to the spur wheel which drives the same, whereby the spur wheel can rotate idly in the gap left by one of the pins which has been previously set up, so that the pin-wheel will remain idle while the spur wheel keeps on rotating.

Fig. 19 is a skeleton top plan view showing the locking means for preventing a traveling movement of the traveling elements of the computing heads during a computing action, the locking means being shown in its effective condition.

Fig. 20 is a detail of one of the stops or tappets which controls the vibratory movement of the traveling element of one of the computing heads, and which also controls the effectiveness of the numeral keys to govern the operation of the computing mechanism.

Figs. 21 to 25, inclusive, are detail side views in elevation, showing the normal and the several active positions of the parts which control the return to their ineffective position of the several locking means for the traveling elements of the computing heads and the traveling typewriter carriage after the computing action has ceased. This mechanism also supplies the necessary energy to the supplementary source of power which is stored up for a future computing action.

Figs. 26 and 27 show the effective and ineffective positions of the cam which trips the clutch-shifting latch.

Figs. 28 to 30, inclusive, are horizontal sections through the selecting and actuating mechanism, whereby the pins on the valuating or index wheel are set up. In the first of these figures, 28, the parts are shown in their normal unactuated position; in the second of these figures, 29, the parts are shown with one of the selectors actuated to bring the corresponding interponent into the path of the striker or hammer, and the third of these figures, 30, shows the next step after the step shown in Fig. 29, wherein the hammer or striker has been actuated and has set up a new pin corresponding to the particular numeral key actuated.

Fig. 31 is a diagrammatic view showing the relation of the interponents to the pins on the pin-wheel, whereby these interponents when in their actuated position, may be cammed aside during the rotation of the pin-wheel.

Figs. 32 and 33 are top plan views, showing the relation of one of the pin-setting interponents to the pin-wheel. In the latter figure, the interponent is shown in the action of setting the opposed pin, and in the former figure, the interponent is shown in the position occupied during the rotation of the pin-wheel, where it is being cammed toward the center by the several pins.

Referring more particularly to the separate parts of this invention, as embodied in the form shown in the drawings, 1 indicates alphabet keys, and 2, numeral keys (Fig. 7), which are mounted on key levers 3 and act when depressed to rock bell cranks 4, so as to swing type bars 5 upwardly against the front side of a platen 6, mounted to rotate on a carriage 7, which itself is mounted to travel on the frame 8 of the machine. The traveling movement of the carriage 7 is controlled by an escapement mechanism, indicated in general by the numeral 9, and including a rack bar 10 connected to the carriage, and a pinion 11 meshing with the rack bar. The pinion 11 is controlled in its movement by a ratchet wheel 12, which is engaged by a loose dog 13 and a fixed dog 14, connected to be rocked by a universal frame 15, which is reciprocated at the action of every character key, by a heel 16 on each of the type bars 5.

Particular attention is called at this point to the fixed dog 14, in that it is used as will be subsequently described, to prevent a traveling movement of the carriage 7 while a computing action is going on.

The numeral keys 2 not only operate the type actions, but also are connected to control the computing mechanism which operates concomitantly with the typewriting mechanism. For this purpose, each of the numeral key levers 3 is connected by a link 17 (Figs. 1 and 5), to rock a bell crank 18, which in turn draws on a rod 19, which has secured at its end, a block 20, to which is pivotally connected a selector 21 (Figs. 28 to 30 inclusive), arranged to shift the corresponding one of a series of interponents 22 from an ineffective position to an effective position where it can be actuated by a universal striker or hammer 23, so that it will be plunged against the apposite one of a series of index pins 24 mounted to be set from a position projecting on one side of an index wheel 25, to a position projecting on the other side of the index wheel 25. This mechanism forms a part of a valuating mechanism, which determines the extent to which the computing wheels of one or more computing heads 26 and 27 may be rotated by a source of power, indicated by an electric motor 28. The extent of movement corresponds in each instance to the value of the particular numeral key actuated.

The interponents 22 are floatingly mounted by extending through tangentially-arranged slots 29 (Fig. 12) in a spider 30, and by having pin-and-slot connections 31 with their respective selectors 21. This arrangement enables the selectors 21 to shift the interponents 22 from their ineffective position with ears 32 located out of the path of the hammer 23, to their effective position with the ears 32 located in the path of the hammer 23 and yet admitting of the interponents having a longitudinal movement relative to the selectors. The interponents 22 are yieldingly held in any adjusted position by individual springs 33 mounted on a hub 34, and engaging the inner sides of the interponents. The springs 33 enable their interponents to be cammed aside, as will be seen by reference to Figs. 31 to 33 inclusive, when the wheel 25 starts to rotate after a pin has been set up and the interponent is still held in its projected position. This action is aided by providing each interponent end with a blade-like extension bent so as to be easily cammed aside by the oncoming pins. This action is further aided by the tangential arrangement of the slots 29 which permits the movement of the interponents toward the axial center of the pin-wheel 25, inasmuch as the movement of the interponents instead of being radial is tangential.

In order that more than one numeral key may not be actuated at the same time, each of the selectors 21 is provided with an interfering or locking blade 35, which extends into a corresponding slot 36 in the hub 34. The slots and blades are arranged radially, so that when one selector is actuated its interfering blade will pass across the central axis of the hub 34, preventing any other selector from being fully actuated.

It will be noted that the hammer or striker 23, which acts as an actuator for the interponents 22, is not only arranged to plunge them forwardly to set the pins 24, but is also arranged to return the interponents to their normal positions. For this purpose, as will be seen by reference to Fig. 13, the actuating hammer is shown in the form of two spaced rings 37 and 38, secured on a rod 39, which is slidingly mounted in bearings 40 and normally opposed to a movement, such as would actuate an interponent to set a pin, by a spring 41.

During a setting-up motion of the actuator or hammer 23, the ring 37, which is guided for movement by a bar-and-slot arrangement 42, engages the ear 32 of the particular interponent which happens to be shifted to its effective position. During a return movement of the actuator or hammer 23, the other ring, 38, which is mutilated, engages a shoulder 43 on the particular interponent which has been previously actuated to set up a pin.

In order to operate the actuator or hammer 23, the rod 39 has secured thereto a block 44, which is connected by a link 45 to a cam arm 46 on a shaft 47. The shaft 47 (Figs. 1 and 11), is normally under a tendency to rotate, owing to a spring 48, which forms a supplementary source of power, and tends to raise a bar 49 having a rack 50 engaging a pinion 51 on the shaft 47. The shaft 47, however, is prevented from rotating by a locking dog 52, which engages a ratchet wheel 53 connected to the shaft 47. The ratchet wheel 53, while not fixed on the shaft 47, is connected so that it will prevent a rotation of the shaft under the propulsion of the spring 48, just so long as the dog 52 is in engagement therewith, but will permit a rotation in the opposite direction.

For this purpose, the ratchet wheel 53 is provided with a one-way crown gear or clutch 54, which is engaged by a corresponding clutch 55, splined on the shaft 47 and normally held in engagement therewith by means of a spring 56. This arrangement is to enable the subsequent counter-rotation of the shaft 47 to restore the power in the spring without disturbing the dog 52, which is normally held in engagement with the ratchet wheel 53 by a spring 57. The ratchet wheel 53 is prevented from a reverse rotation by a spring-pressed pawl 241.

In order to trip the dog 52 and permit a rotation of the shaft 47, connections are provided whereby any one of the numeral keys 2 may release the dog 52 from the ratchet wheel 53. For this purpose, the rods 19 which are connected to the numeral keys 2, as above explained, extend through slots 58 (Fig. 5) in a collar 59 on a hub 60. The collar 59 lies in the path of the blocks 20, so that when any one of the numeral keys is depressed to shift the corresponding selector 21, the collar 59 with its hub 60, will be forced back against the tension of a spring 61, which is mounted on a rod sliding in bearings 62 and connected to reciprocate with the hub 60. This hub 60 has connected thereto, so as to actuate the same, a lever 63 pivoted intermediate its ends and having at one end a tripper 64, shown in the form of a plunger extending to a position in opposition to an adjustable contact screw 65, mounted on the dog 52. It will thus be seen that when any one of the numeral keys is actuated, so long as the tripper 64 is in opposition to the contact screw 65, then the dog 52 will be forced out of engagement with the ratchet wheel 53 against the tension of its spring 57, thus permitting a rotation of the shaft 47. Hence the shaft 47 will draw on the link 45 to actuate the hammer 23, so that the latter will force forward the particular interponent shifted into play and corresponding to the numeral key actuated, so that it will set the apposite pin 24 on the valuating wheel.

In order that the dog 52 may return to its effective position and catch the ratchet wheel 53 after it has made a fifth of a revolution, there is provided on the shaft 47, a collar 66 provided with a deflector 67 (Figs. 5 and 17), which will come up in time to shift the tripper 64 up out of the path of the contact screw 65, in order that the spring 57 may return the dog to its effective position where it will catch the next tooth on the ratchet wheel 53. There are five teeth on the ratchet wheel 53, located at one-fifth of the pitch circle from each other, so that the extent of movement of the shaft 47 is just one-fifth of a revolution.

It may be noted in passing that the deflector 67 not only forces the tripper 64 out of the way of the dog 52, but also shifts it to an ineffective position, so that if by any chance a numeral key should be struck during a computing action by the previous striking of a numeral key, the tripper 64 will be operated idly without actuating the dog 52, thus preventing the piling of one computation on top of another. In other words, the numeral keys, after having once incited the computing mechanism to action, are rendered ineffective to start a further computation until the computation under way has been completed.

Before considering other actions which are started by the rotation of the shaft 47 at the actuation of a numeral key, it would be well to consider how the valuating mechanism including the index pin-wheel 25 is driven from the source of power indicated by the electric motor 28. Normally, that is to say, when no numeral key is actuated, it will be seen by reference to Figs. 14 and 18, the pin which was most recently set up, forms a gap in the series of pins, such that a spur-wheel 68, which is arranged to rotate the pin-wheel 25 by engagement with the pins 24, will be located in the gap formed by this set-up pin, so that the spur-wheel 68 may rotate idly without engaging any of the pins 24, and thus without having any capacity to rotate the pin-wheel 25. In other words, the gear formed by the pins 24 is mutilated at the point of the set pin, thus interrupting the drive between the spur-wheel 68 and the pin-wheel 25.

When the shaft 47 is rotated, as above mentioned, it carries around a cam 69 (Figs. 1, 14 and 17), which cam carries a bearing roller 70 arranged to engage a pin-restorer 71, in the form of a finger, which is located in opposition to the set pin forming the gap in which the spur wheel 68 rotates idly. As the cam 69 rotates with the shaft 47, it forces the pin-restorer 71 against the tension of a spring 72, so that the pin-restorer will force the set pin from its set position to a position projecting on the same side with its fellows, thereby completing the mutilated gear at this point. If, by any chance, the spur-wheel 68 should happen to have one of its teeth lying in the path of movement of this particular pin when moving from its set to its unset position, the spur-wheel, which, as will be seen by reference to Fig. 14, is fixed to a slidingly-mounted shaft 73, will recede against the tension of a spring 74, normally holding the spur-wheel with its tooth projecting into the pitch circle of the gear formed by the pins 24. As the spur-wheel 68 recedes, it will be shifted slightly by a beveled cam 75, which engages the beveled teeth of the spur-gear 68, so as to bring the space between two teeth of the spur-gear into alinement with the pin which has just been projected from its set to its unset position, so that there will be formed a positive driving connection between the spur-gear 68 and the pins of the index wheel 25.

The shaft 73 receives its drive from a bevel gear 76, but is not always driven as the gear 76 is loosely mounted thereon and arranged to be connected up to the shaft by means of a clutch 77, which is splined on the shaft 73, so as to be slid into engagement with a corresponding clutch element 78 mounted on the hub of the bevel gear 76. The connection of the clutch 77 to the clutch element 78 takes places during the rotation of the shaft 47, and is controlled from the cam 69, which has a projection 79 normally engaging a finger 80 on a shifting lever 81, so as to hold the clutch 77 normally in its dis-engaged position against the tension of a spring 82.

When, however, the shaft 47 rotates the hump or projection 79 on the cam 69, will move from beneath the finger 80, so that the dip which is located just beyond the hump permits the spring 82 to draw the shifting lever 81 over. The upper end of the lever which engages in an annular groove in the clutch 77 will then shift the clutch 77 into engagement with the clutch element 78, and thus cause a driving connection between the bevel gear 76 and the shaft 73, so that the spur-wheel 68 may be rotated to rotate the index wheel 25, an amount dependent on the particular pin 24 which is set up at the time that the previously set pin was unset. That is to say, the pin-wheel 25 will be rotated until the blank formed by the just set pin comes in opposition to the spur-wheel 68, when the spur-wheel will once more rotate idly in the gap thus formed.

The bevel gear 76 is driven from the motor 28 by meshing with a bevel gear 83 (Fig. 3) mounted on a shaft 84, which is connected by a pair of bevel gears 85 and 86 to the shaft 87 of the motor 28.

The valuating or pin-wheel 25, which thus receives a variable rotation from the motor 28 depending upon the particular numeral key actuated, is arranged in turn to rotate the computing wheels of the computing heads 26 and 27. For this purpose, the valuating or index wheel 25 is secured to a shaft 88, which also has fast thereon, a bevel gear 89 meshing with a bevel gear 90 on a shaft 91. The shaft 91 is connected to drive a vertical shaft 92 by intermeshing bevel gears 93 and 94.

The shaft 92 is connected to drive master-wheel shafts 95 and 96, one for each computing head. For this purpose, the master-wheel shafts have secured thereto, respectively, bevel gears 97 and 98, the former of which meshes with a pair of oppositely-faced bevel gears 99 and 100, and the latter of which meshes with a pair of oppositely-faced bevel gears 101 and 102. The paired bevel gears are arranged to drive their associated master-wheel shafts in opposite directions, according to which one is connected in driven relation with the shaft 92. That is to say, the bevel gears 99 to 102, inclusive, are loosely mounted on the shaft 92 but connectible thereto by means of clutches, indicated in connection with the computing head 26 by the numeral 103, and in connection with the computing head 27 by the numeral 104. These clutches are splined on the shaft 92, so as to rotate therewith and yet be capable of shifting between the paired bevel gears, so as to connect either one in each pair with the shaft 92. These clutches may also occupy intermediate positions corresponding to the disconnection of both the bevel gears in each pair from driven relation with the shaft 92.

Each master-wheel shaft is arranged to drive a master wheel 105 secured thereto and having radiating teeth arranged to engage inwardly-projecting teeth on a series of computing wheels 106 (Fig. 8), which also have outwardly-projecting teeth to form gear wheels 107 which mesh with gears 108 connected to dial wheels 109, which are arranged to exhibit their numbers through sight apertures 110 in the computing head casing 111. A relative movement is provided between each master wheel and its computing head, so that the master wheels may successively actuate the several computing wheels of each head. Either the master wheel may move or the set of computing wheels may travel. In the case of the computing head 26, the set of wheels is shown to be connected by a latch 242 to the carriage 7, so as to travel therewith relatively to the stationary master wheel. In the case of the computing head 27, the set of computing wheels is shown to be stationary and the master wheel is mounted on a slide 112, to form the traveling element. This slide is arranged to be reciprocated by a lever 113, which, as will be seen by reference to Figs. 15 and 16, has a dog 114, arranged to engage the successive ones of a series of tappets or column stops 115 mounted on a rack 116 carried by the carriage 7.

This arrangement is more particularly described and claimed in application, Serial No. 574,813, filed August 1, 1910, and will not be described in detail at this point. Sufficient to say that the successive tappets 115 pick up the dog 114 and move the master wheels step by step through the intermediary of the lever 113, until the limit of the computing head is reached, when the dog 114 is tripped from the tappet 115 and the master wheel returned to its initial position in the computing wheel of highest denomination, by means of a spring 117.

In addition to rotating the master wheels by power, a tens-carrying mechanism indicated in general by the numeral 118, which enables the carrying over of numbers between lower and higher denominations of the computing heads, is also connected up to be rotated by the motor 28. The exact structure of this tens-carrying mechanism is more fully described in a prior application of Degener and Saunders, Serial No. 667,464, filed December 23, 1911, and forms no part of this invention. Sufficient to say, however, that the action depends upon the rotation and direction of rotation of an elongated barrel gear 119 (Figs. 8 and 9), which is connected by a gearing indicated in general at 120, to a shaft 121, in the case of the upper computing head 26, and to a corresponding shaft 122, in the case of the lower computing head 27.

The shafts 121 and 122 are likewise arranged to be rotated in opposite directions for adding and subtracting, and hence are provided with bevel gears 123 and 124. The bevel gear 123 meshes with oppositely-faced bevel gears 125 and 126, loosely mounted on a shaft 127, but arranged to be connected thereto by a double clutch 128, which is splined on the shaft 121 and movable from an intermediate position in which neither one of these bevel gears 125 and 126 is connected to the shaft 127, to alternative positions in which either one of the bevel gears is clutched to the shaft 127. The bevel gear 124 for the tens-carrying mechanism for the lower computing head 27 likewise meshes with a pair of oppositely-faced bevel gears 129 and 130, which may also be alternatively clutched to the shaft 127 by means of a sliding clutch 131, which is splined on the shaft 127. The shaft 127 is driven from a shaft 132 by means of a pair of meshing bevel gears 133 and 134. The shaft 132 is driven from the shaft 84 by means of meshing bevel gears 135 and 136.

We have thus far described the mechanism as if we assumed that the motor was constantly rotating. This, however, is not the case. The motor 28 is only started in action when a numeral key is depressed. For this purpose, the cam arm 46 (Figs. 1 and 11), which enables the operation of the actuator or striker 23 from the supplementary source of power 48, engages a wiper or roller 137, mounted on a bell crank lever 138 pivoted at 139 (Fig. 3). The lever 138 is joined by a link 140, to one end of a lever 141 pivoted intermediate its ends and carrying, at its opposite end, a bearing roller 142 made of some non-conducting material, such as hard rubber. The bearing roller 142 is arranged to engage one of a pair of electric contacts 143 and 144, to bring about an engagement therebetween, so as to form a switch completing the electrical circuit, represented by wires 145, to the motor 28. The contacts 143 and 144 are made of spring strips and are mounted in any suitable manner on an insulated block 146, so that they will automatically spring apart when the pressure on the contact strip 143 is relieved by a return of the lever 141.

This mechanism not only completes the circuit through the electric motor 28, but also brings into play, a special or supplementary locking mechanism (Fig. 11), which prevents the depression of another numeral key or of the same numeral key, until the computing action which was started by the numeral key just depressed, has been completed and the parts have come to rest. For this purpose, the lever 141 has mounted thereon, a pin 147, which engages in a loop or slot 148 on a link 149. This link is normally under a tendency to move to such a position closing the contacts 143 and 144 under the tension of a spring 150. The link 149 is connected, at its forward end, to an interfering or locking blade 151, which, similar to the selectors 21, is pivoted on a hub 200, which forms a pivotal mounting for these selectors, but unlike the selectors, it is unprovided with an interponent 22. That is to say, its function is solely that of a locking or interfering element, and it extends into one of the slots 36 in the hub 34, so that it will be projected across the center or axis of the hub.

When one of the numeral keys is depressed, it naturally projects the locking blade 35 of one of the selectors 21 across the central axis of the hub 34; then the numeral key further acts to permit a rotation of the shaft 47, so that the cam 46 acts to swing the lever 141, thereby permitting a spring 150 to swing the supplementary locking or interfering blade 151 to a position tending to cross the axial center of the hub 34. It, however, is prevented from so doing, by the locking blade 35 of the numeral key just actuated.

If the numeral key should be returned to its normal raised position, before the computing action has ceased, the spring 150 will act to cause the supplementary locking blade 151 to spring across the axial center of the hub 34, just so soon as the locking blade 35, corresponding to the numeral key just actuated, recedes to its normal position. This, then, will prevent any further numeral key or even the same numeral key, from being actuated, as the locking blade 151 will lie in the path of all of the locking blades 35. As soon as the computing action has ceased, the locking blade 151 will return to its normal ineffective position with the rest of the mechanism.

In order that the traveling elements of the computing heads 26 and 27 and the traveling typewriter carriage 7, may not have a feeding movement while a computing action is taking place, locking means is provided, which comes into play at the instant of starting a computing action. For this purpose, the bar 49, which is actuated by the supplementary source of power, represented by the spring 48, has an upward extension 152 (Figs. 1, 3 and 4), carrying a pair of racks 153 and 154, meshing, respectively, with sectors 155 and 156, mounted on shafts 157 and 158. These shafts are locking shafts and carry, respectively, locking dogs 159 and 160 (Figs. 1 and 19), arranged to engage between the teeth of racks 161 and 162, mounted, respectively, on the casing of the upper computing head 26, which travels with the set of computing wheels, and on the slide 112 of the lower computing head 27, which carries the traveling master wheel.

The racks 161 and 162 have their teeth located at intervals corresponding to the step movements of the traveling elements of the respective computing heads. That is to say, the traveling elements of the computing heads, as has been mentioned above, are moved step by step by the movement of the carriage 7, to bring the master wheels into coöperation with the successive computing wheels of each head. The teeth of the racks 161 and 162 then are located at intervals from one another, corresponding to the intervals of the computing wheel, which may, if desired, correspond to distances equal to the letter-space movements of the carriage 7.

It will thus be seen that when the shaft 47 is rotated by the spring 48, the extension 152 will be concomitantly moved up so as to bring the locking dogs 159 and 160 into engagement with their respective racks, so as to hold the traveling elements of the computing mechanism against a traveling movement; thus preventing a disruption of the connection between the master wheels and the computing wheels with which they happen to be in engagement, while the computing action is going on. The locking of the carriage 7 to prevent it traveling is also accomplished at the same time.

It has been mentioned above, that as each numeral key is struck, the heel 16 on the type bar 5 rocks the pair of pawls 13 and 14 through the intermediary of the universal frame, so as to disengage the loose pawl 13 from the ratchet wheel 12, and to engage therewith the fixed pawl 14. In this type of escapement mechanism, the fixed pawl 14 engages the ratchet wheel 12, at substantially the same point, so that there is no traveling movement of the carriage 7.

Now, in order that the fixed pawl 14 may not return, even after the numeral key which brought it into its position engaging the escapement wheel 12 has returned, until the computing action has ceased, this fixed pawl has connected thereto, a cam arm 163. Engaging with this cam arm 163, there is provided a bearing roller 164, on one arm 165 of a bell crank lever 166. When the arm 165 occupies the dotted position shown in Fig. 7, it will hold the fixed pawl 14 in engagement with the ratchet wheel 12, even if the universal frame 15 and the numeral key actuated return to their normal positions. The bell crank lever 166 is engaged by a coil spring 167, so that it normally tends to occupy the dotted-line position shown in Fig. 7, corresponding to a locking of the carriage 7 against movement.

The other arm, 168, of the bell crank lever 166, however, is engaged by a spiral cam 169, which normally tends to overcome the spring 167 when no numeral key has been actuated, so as to hold the locking arm 165 in the full-line position shown in Fig. 7, corresponding to the permission of the disengagement of the fixed pawl 14 from the ratchet wheel 12. The spiral cam 169 is secured to a shaft 170 (Figs. 7 and 10), which is provided with a pinion 171 engaging a segment 172 on a lever 173. The opposite end of the lever 173 is also provided with a segment 174, engaging a rack 175 on the bar 49.

It will thus be seen that when the spring 48 raises the bar 49, it not only rocks the shafts 157 and 158 to lock the traveling elements of the computing heads against movement, but it also swings the spiral cam 169 to such a position that the spring 167 is free to act, bringing the locking arm 165 to such a position that it will hold the fixed dog 14 in engagement with the escapement wheel 12, preventing a traveling movement of the carriage 7 until the shaft 47 and the bar 49 have been returned to their normal positions, which takes place after the computing actions started by an actuated numeral key have been finished; that is to say, after the number corresponding to the numeral key actuated has been run up on the computing heads.

In order to bring about an unlocking of the traveling elements of the computing heads, the numeral keys and the carriage, it is necessary to return the bar 49 and the shaft 47 to their normal positions against the tension of the spring 48, and at the same time retensioning said spring. For this purpose, advantage is taken of the final movement before stopping of the valuating or index-wheel 25.

It has been shown above how the valuating wheel 25 is driven from the spur-gear 68 as soon as a new pin has been set up and the old pin restored to its normal position. As soon as the valuating wheel 25 starts in action, one of the pins 24 (Figs. 1, 3 and 21 to 27 inclusive), engages a cam head 176 on a shifter 177, pivoted at 178, forcing it from the normal position shown in Fig. 21 to the position shown in Fig. 22, wherein a catch 179 thereon falls behind an ear 180 of a latch 181, which is drawn up by a spring 182. The latch 181 is pivotally mounted at 183, on a compensating lever 184, which is pivotally mounted at 185, on a clutch-closer 186 pivoted at 187. The compensating lever 184 is also connected to the clutch-closer 186 by a spring 188, forming a semi-positive connection.

When the shifter 177 is thus positively connected to the clutch-closer 186, the shifter may actuate the clutch-closer to force a clutch element 189 splined on the shaft 132, into engagement with a clutch element 190 on a sleeve 191, which is loosely mounted on the shaft 132 and against the tension of a spring 192, which normally tends to spread the clutch elements out of engagement with each other.

It will be noted at this point, that the compensating lever 184, which really forms a part of the clutch-closer 186, is thus loosely connected so as to permit the teeth of the clutch elements 189 and 190 to settle properly into engagement with each other.

In order to give the necessary movement to the shifter 177 after it has engaged the latch 181, so as to close the clutch by actuating the clutch-closer 186, the shifter 177 is provided with an arm 193 extending to the opposite side of the valuating wheel 25 from the side at which the cam head 176 is located, so that a lug or enlarged head 194 (Fig. 1) on this arm 193, will engage with the newly-set pin as it comes around to its stopping position corresponding to the location of the gap formed by the set pin on the opposite side coming into register with the spur-wheel 68. The set pin 24 will come into engagement with this arm 193 before it has entirely finished its movement, so that it will rock the shifter 177 to swing the clutch-closer 186 into such a position that the clutch elements 189 and 190 will be brought into engagement with each other in the position shown in Fig. 25, thereby forming a positive drive between the shaft 132 and the sleeve 191. Incidentally the head 176 on shifter 177 comes between two pins 24, and accurately determines the stopping point of the wheel 25.

It will be noted in passing that when the shifter 177 was forced down by the initial rotation of the pin-wheel 25, the arm 193 thereon engaged the top edge of the pin-restoring finger 71, forcing it down from the position shown in Fig. 21 to the position shown in Fig. 22 against the tension of its spring 72, the finger 71 being slidingly and pivotally mounted by having a slot 195 engaging a pin 196. The finger 71 also has a loose connection with the pin 196, permitting a transverse movement, so that as the newly-set pin 24 comes around, it can cam the finger 71 sidewise out of the way to the position shown in Fig. 23. The spring 72 is arranged not only to return the finger out of engagement with the pin it has restored, but also to lift it to its uppermost position, and swing it back to its normal position resting against a stop 197. That is to say, the spring 72 opposes the movement of the pin-restoring finger 71 in the three directions of movement of which it is capable, namely: inwardly, to restore the previously set pin; downwardly, under the impulse of the shifter 177, and, sidewise, under the camming action of the newly-set pin coming into its stopping position.

The whole purpose of connecting up the sleeve 191 to the shaft 132, so as to be driven thereby, is, as has been mentioned above, to retension the spring 48 and unlock the parts previously locked at the beginning of the computing action. To accomplish this, the sleeve 191 is provided with a cam 198, which as the sleeve rotates engages a cam follower 199 in the form of a roller rotatably mounted on a double bell crank 200 (Figs. 1 and 3). The bell crank 200 is pivoted at 201 and held in a normal position by a spring 202, engaging one arm 203 of the bell crank. Another arm, 204, of this bell crank is provided with a slot 205, into which extends a lug 206 on the extension 152 of the bar 49.

It will be noted that the cam 198 is a double cam and finishes its action in less than a half of a revolution of the sleeve 191, so that it takes but half of a revolution of the shaft 132 to oscillate the bell crank 200 its fullest extent, thereby forcing down the extension 152 and the bar 49 its fullest extent. This action naturally reverts the shafts 157 and 158 to bring the locking dogs 159 and 160 out of engagement with their respective racks 161 and 162, thus freeing the traveling elements of the computing heads 26 and 27, so that they can subsequently move on to bring the next computing wheels into register with the master wheels.

The movement of the bar 49 downward not only retensions the spring 48 but reverses the shaft 47 and brings it back to its normal position. Under these conditions, the cam 79 will once more force the finger 80 and the shifting lever 81 out against the tension of the spring 82, disconnecting the clutch elements 77 and 78, thereby stopping the drive of the spur-wheel 68 from the motor 28.

The counter-rotation of the shaft 47 is permitted by the clutch element 55 slipping by the clutch element 54, against the tension of the spring 56. This counter-rotation of the shaft 47 will also move the roller 70 away from the pin-restoring finger 71, permitting the spring 72 to return the pin-restoring finger 71 to its normal position.

In addition to these actions, the cam arm will return to its normal position enabling the spring 41 to retrieve the striker 23, so that the mutilated ring 38 will return to its former position the particular interponent 22 which was forced forward by the hammer or striker 23, to start the computing action.

It is desired to prevent the breaking of the circuit to the electric motor immediately so that the motor may run until the computing action is entirely completed, and maybe a short time subsequent thereto, whereby if the numeral keys are repeatedly struck, the action of the motor will be substantially continuous. To do this, the arm 204 of the double bell crank 200 is provided with a pin 207, which engages the bottom of a slot 208 in a thrust link 209 toward the end of the downward rocking movement of the arm 204 so as to prevent the return of the following roller 137 to which the link 140 is secured. The following roller 137 is secured on the bell crank 138, which is connected to the thrust link 209. This then prevents the return movement of the lever 141 with the return movement of the cam arm 46 and the shaft 47. As soon, however, as the roller 199 drops off the cam 198, the double bell crank 200 will return, permitting the return of the roller 137, and thus permitting the reverse oscillation of the lever 141, whereby the contacts 143, 144 will separate themselves, and the special locking blade 151 will be withdrawn from its locking position. The return of the bar 49 will necessarily rock the lever 173, to rotate the shaft 170, and thus rock the bell crank 166 against the tension of the spring 167, so as to permit the loose pawl 13 to be engaged by the escapement wheel 12, permitting a step movement of the carriage 7 an extent determined by the movement of the loose pawl 13.

After all the locking parts have been rendered ineffective and the spring 48 retensioned ready to initiate a new computing action, it is desirable to disconnect the clutch elements 189 and 190. For this purpose, the hub 191 has formed thereon, a double cam 210 (Figs. 21 to 27), with the arms so arranged that as a semi-revolution of the sleeve 191 is completed, one arm of the cam 210 will engage the latch 181 to disengage the same from the catch 179, permitting the clutch-closer 186 and the clutch element 192 to return to their normal positions under the tension of the spring 189. This action will also bring the extended surface of the lug 180 on the latch 181 beneath the catch 179 ready to be subsequently reëngaged with the catch by a future rocking movement of the shifter 177.

It is not always desirable that the numeral keys 3 shall be capable of controlling the computing mechanism. That is to say, it is sometimes desirable that the numeral keys be free to actuate the typewriting mechanism without any computing. For this purpose, a controlling mechanism is provided, whereby the carriage may automatically govern, by its position, the capacity of the numeral keys to control the computing mechanism. This automatic controlling mechanism may in turn be rendered effective or ineffective by manual means actuable at will in a selective manner.

Considering this mechanism specifically and with reference to Fig. 5, it will be seen that the tripper 64, which starts the computing action when any one of the numeral keys is depressed by permitting a rotation of the shaft 47 under the impulse of the spring 48, is so mounted that it can be shifted to an ineffective position, as shown in dotted lines in Fig. 2.

To enable the adjustment of the tripper 64 between active and inactive positions, there is provided a shifter 211, which has an opening through which the tripper is passed, permitting it to play in the shifter and yet enabling the shifter to adjust the tripper from one position to another. The shifter 211 is shown in the form of a bell crank lever, having connected to one end thereof, a link 212, which is connected at its opposite end to a double bell crank compensating lever 213, pivoted at 214, through the intermediary of a lever 228 and a link 229. The movement of the bell crank lever 213 is limited by having one arm thereof forked to form two tines 215 and 216, extending on opposite sides of a fixed stud 217. The compensating lever 213 is not positively actuated but is under a tendency to move in one direction or the other, owing to the tension of a spring 218, according to the direction of pull on this spring. The direction of pull on this spring is determined by a pair of adjustable segment gears 219 and 220, which mesh with each other and are adjustable from the position shown in Fig. 5 to the position shown in Fig. 6, by means of a finger-piece 221, to determine the effectiveness of this controlling mechanism.

It will be seen that in the position shown in Fig. 5, the spring 218, which is secured to the lower segment gear 214, tends to draw the segment gear 214 and the lower arm of the lever 213 toward each other. To overcome this tendency, a second spring 222 is provided, which engages a loosely-mounted interponent lever 223, which is provided with a pin 224 engaging on the under side of an arm 225 of the compensating lever 213. The spring 222 is stronger than the spring 218, so that it overcomes any tendency of the spring 218 to draw the segment 220 and the lower arm of the lever 213 toward each other. To do this, the interponent lever 223 is provided with a toe 226, which engages a pin 227 on the segment 220. It will thus be seen that inasmuch as the interponent lever 223 engages both the segment gear 214 and the lever 213, that it overcomes the tendency of the spring 218 to draw the segment 220 and the lower arm of the lever 213 toward each other. The segments themselves are prevented from further movement, due to the tension of the spring 218, by enlarging the end teeth of the segments, so that they will not properly mesh with each other.

It will be noted in passing that the spring 218 acts in either position of adjustment of the segments, so that it always tends to draw the lower arm of the lever 213, whether in the position shown in Fig. 5 or in the position shown in Fig. 6, toward the segment 220.

It will thus be seen that inasmuch as the spring 222 is stronger than the spring 218, it will normally act to hold the lever 213 in the position shown in Fig. 5, if the gears 219 and 220 are in the position shown in Fig. 5, so that the shifter 211 will be in its raised position shown in dotted lines in Fig. 2 and in full lines in Fig. 5. That is to say, under normal conditions, the tripper 64 is raised to its ineffective position.

In order then to permit the tripper 64 to fall to its full-line position shown in Fig. 2, that is, to its effective position, it is necessary to overcome the tension of the spring 222, and permit the action of the spring 218. For this purpose, there is connected to the pin 224 on the floating lever 223, a link 230, which is rocked by a bell crank 231 when a link 232 is pulled upon. The link 232 is connected to a lever 233, overlying one arm 234 of a bell crank lever 235, the other arm of the lever being extended out in the form of a plate with an overturned end, so as to form a bearing surface of considerable extent, indicated at 236. This surface is shown, in this instance, to be composite, that is, formed of two plates 237 and 238, so that the extent thereof may be varied according to the length of the computing zone desired. At any rate, the ends of the plates forming the bearing surface 236, are beveled, so as to properly engage one or more of the tappets or stops 115, adjustably mounted on the rack 116, carried by the carriage 7.

It will be seen that when the back end of one of the tappets 115 comes into engagement with the bearing surface of the bell crank lever 235, it will cam the same rearwardly rocking the bell crank lever, so as to raise the arm 234, and thus rock the bell crank 231, which will pull down on the interponent lever 223. This action will stretch the spring 222, permitting the spring 218 to act, at the same time forcing the segment 220 slightly around, so as to insure the bringing of the lower part of the lever 213 over toward the left, as viewed in Fig. 5. This will permit the shifter 211 to rock down into its full-line position shown in Fig. 2, enabling the tripper 64 to drop into alinement with the contact screw 65 on the dog 52. Thus, so long as one of the tappets is in engagement with the bearing surface 236, and with the segments 219 and 220 in the position shown in Fig. 5, then the tripper 64 will be in its effective position in which any of the numeral keys can cause it to trip the dog 52, permitting a rotation of the shaft 47. Each tappet 115 determines, by engagement with the edge 236, a computing zone solely during which engagement, computing can take place; at all other times, the numeral keys are incapable of actuating the computing mechanism.

By adjusting the segments 219 and 220 from the position shown in Fig. 5 to the position shown in Fig. 6, even when a tappet 115 is in contact with the bearing edge 236, no computing action can take place. The reason for this is that the spring 218 is on the opposite side of the pivot 214 and exerts all its tendency to pull the lower end of the lever 213 to the right. That is to say, to a position corresponding to the raising of the shifter 211 and the tripper 64.

In considering the operation of the device, if it is desired to merely typewrite without computing, the finger-piece 221 would be manipulated to the position shown in Fig. 6, so that the shifter 211 would be held in its raised position preventing the tripper 64 to drop down to its effective position. With such a relation of the parts it would be immaterial whether or not any of the tappets 115 came into engagement with the zone-computing bell crank 235, as there would be no tendency to drop the tripper 64 to its effective position under such conditions.

If, however, it is desired to simultaneously compute as well as typewrite in different zones along the work-sheet, it is necessary to adjust the manual controlling mechanism including the segments 219 and 220 to the position shown in Fig. 5, wherein whenever one of the tappets 115 comes into engagement with the bearing edge 236 of the zone-controlling bell crank 235, then the tripper 64 will be allowed to fall down, by reason of the fact that the shifter 211 is rocked down to its full-line position shown in Fig. 2. Under this condition of affairs, whenever a numeral key 2 is struck, not only will the type action be brought into play to strike the numeral on the work-sheet on the platen, but the corresponding interponent 22 will be shifted from an ineffective position to an effective position. When this has been accomplished, the further movement of the numeral key will cause the block 20 associated therewith, to shift the collar 59, and thus plunge the tripper 64 forward, until it engages the contact screw 65, thereby removing the locking dog 52 from engagement with the ratchet wheel 53. When this takes place, the shaft 47 will be free to rotate under the impulse of the auxiliary source of power represented by the spring 48, which forces the bar 49 upward. The extent of rotation, however, is but one-fifth of a revolution of the shaft 47, inasmuch as the tripper 64 is moved from an interfering position by the deflector 67 rotating around with the shaft 47. This permits the dog 52 to snap back and engage the next tooth on the ratchet wheel 53, which is located a fifth of a revolution from the previous tooth.

During the rotation of the shaft 47, the extension 152 on the bar 49 was moved upwardly with the bar 49, so that it rocked the shafts 157 and 158, bringing the locking dogs 159 and 160 into engagement with their locking racks on the traveling elements of the computing heads. The traveling elements are thus locked from traveling movement, so that there will be no interfering action during the running up of the number corresponding to the numeral key actuated on the computing wheels of the computing heads.

The carriage 7 is at the same time locked against movement by the cam 169, which is likewise controlled from the bar 49, moving away from engagement with the arm 168, so that the arm 165 is free to move forward into the dotted-line position shown in Fig. 7, under the propulsion of the spring 167, so as to hold the fixed dog 14 in locked engagement with the escapement wheel 12.

While this locking action is going on, and, in fact, before it is completed, the cam arm 46 rotates with the shaft 47, so as to pull the striker or hammer 23 against the tension of the spring 41, whereby the particular interponent which has been placed to its effective position, will be plunged forward against the apposite index pin 24, projecting it to its set position on the opposite side of the wheel 12. With the movement of the cam arm 46, the roller 137 and the lever 138 will be moved by the cam arm, so as to rock the lever 141 and thus bend the spring contact 143 into engagement with the contact 144, closing the circuit to the motor 28, thereby inciting it to action. The rocking of the lever 141 also permits the spring 150 to act, whereby the special locking blade 151 will be sprung in as far as it can go: that is to say, until it comes into contact with the locking blade 35 of the particular selector 21 which happens to be in action. This locking blade 151 will take the place of this selector-locking blade in case the numeral key actuated is returned to its normal position before the computing action has ceased, thereby preventing this and any other numeral key from being actuated until the computing action is finished.

During the rotation of the shaft 47, the cam 69 was carried around therewith, so that the pin-restoring finger 71 was forced against the previously set-up pin, so as to complete the mutilated gear formed by the index pins at a point where the spur-wheel 68 is located. At the same time, the cam hump 79 on the cam 69 moves away from the finger 80, so as to enable the spring 82 to bring the clutch elements into engagement with each other, thereby completing the drive between the shaft 73 and the bevel gear 76, and thus between the spur-wheel 68 and the motor 28.

As the spur-wheel 68 rotates, it will engage the pins 24, inasmuch as the mutilated gear is now completed at this point, and rotates the valuating wheel 25 until the next gap therein comes in apposition to the spur-wheel 68. This gap is formed by the pin just set up, and is located at a distance from the spur-wheel corresponding to the value of the numeral key just struck. This rotation will be transferred through the inter-connected gearing to the master wheels in the computing heads, whereby the computing wheels in engagement therewith at the particular instant will be rotated a corresponding distance to add or subtract the numeral corresponding to the key struck.

The tens-carrying action may continue on as is well known in this type of machines, subsequent to the running up of the number.

As the pin which has just been set up approaches its stopping position, corresponding to the register of the gap which it produces on the valuating wheel 25 with the spur-wheel 68, it will engage the shifter 177, which has previously been rocked forward by one of the other pins 24 to such a position that its catch 179 is caught by the latch 181 connected to the clutch-closer 186. The set pin going to its home position, will crowd the shifter 177 before it, rocking the clutch-closer 186, so as to make a driving connection between the shaft 132 and the sleeve 191. This sleeve will then rotate, so that the one arm of the cam 198 thereon, will rock the bell crank 200 to force down the extension bar 152, and thus the bar 49. This action will retension the spring 48, returning the shaft 47 and all connected parts to their normal positions. At the end of this action the special locking blade 151 will be withdrawn, and the circuit to the motor broken. As the cam 198 completes its action, the cam 210, also connected to the sleeve 191, is rotated, to bring one arm thereof to such a position that it will disengage the latch 181 from the shifter 177, permitting the shifter and the clutch-closer 186 to return to their normal positions, wherein the sleeve 191 will be operatively disconnected from the shaft 132.

As all of the parts have thus been returned to their normal positions and the computing action silenced, the machine is ready to permit the striking of a second numeral key to run up another computation corresponding to this newly actuated numeral key.

Variations may be resorted to within the scope of the invention, and portions of the improvements may be used without others.

Having thus described my invention, I claim:

1. The combination with a typewriting mechanism including a traveling carriage, with an escapement for said carriage having a fixed pawl preventing a movement of said carriage, of a computing mechanism including one or more computing heads and mechanism for running up numbers on said computing heads, a bracket on said fixed pawl, an arm engaging said bracket, an arm secured to said first-mentioned arm, a spring normally tending to force said first-mentioned arm to a position tending to hold said fixed pawl in its locking position, so as to prevent a traveling movement of said carriage, a spiral cam engaging said second-mentioned arm and normally overcoming the tendency of said spring, a shaft for said spiral cam, a gear on said shaft, a reciprocatory bar, connections between said gear and said bar, a spring normally under a tension, tending to move said bar so as to rotate said cam, to enable the movement of said fixed pawl to its effective position, and means brought into play at the initiation of a computation for enabling said second-mentioned spring to act.

2. The combination with computing mechanism, of actuating mechanism therefor, means controlling the action of said actuating mechanism, including a driving element, a driven element, a clutch connection between said elements, a spring normally interrupting said clutch connection, a clutch-closer for overcoming the tension of said spring to connect said driven element in driving relation with said driving element, a compensating lever pivotally mounted on said clutch-closer, a spring connecting said compensating lever with said clutch-closer, a latch pivotally mounted on said compensating lever, a spring for said latch, a shifter mounted to engage said latch and movable to shift said clutch-closer through the intermediary of said latch and said compensating lever, and means for disconnecting said latch from said shifter after the functions of said driven element have been accomplished.

3. The combination with a valuating member having a series of pins settable from an ineffective position to a computation-controlling position, of a pivoted pin-restoring finger for returning a set pin to its unset position, said pin-restoring finger being so mounted on its pivot as to have a three-way movement to unset said pins and to avoid said pins during a motion thereof, said movement comprising a pivotal movement, a sliding movement in the plane of the pivotal mounting, and a swinging movement in a plane transverse to the plane of the pivotal mounting.

4. The combination with a valuating member having a series of pins settable from an ineffective position to a computation-controlling position, of a pivoted pin-restoring finger for returning a set pin to its unset position, said pin-restoring finger being so mounted on its pivot as to have a three-way movement to unset said pins and to avoid said pins during a motion thereof, said movement comprising a pivotal movement, a sliding movement in the plane of the pivotal mounting, and a swinging movement in a plane transverse to the plane of the pivotal mounting, and a spring for returning said pin-restoring finger to its normal position from all three directions of movement.

5. The combination with a valuating member having a series of pins settable from an ineffective position to a computation-controlling position, a pin-restoring finger for moving said pins from a set to an unset position, and a shifter for depressing said finger after a setting action.

6. The combination with a valuating mechanism including a series of pins settable to determine the extent of movement of the valuating mechanism, numeral keys connected to set said pins, a source of power for driving said valuating mechanism, a normally interrupted train of connections between said source of power and said valuating mechanism, a shifter for completing said train, a pin-restorer for restoring the set pins in said valuating mechanism, and a single cam acting concomitantly to enable the restoring of a set pin and a movement of said shifter to control said interrupted connections.

7. The combination with a valuating mechanism including a series of pins settable to determine the extent of action of said valuating mechanism, numeral keys connected to set said pins, a source of power to drive said valuating mechanism, a train of connections between said source of power and said valuating mechanism, said train of connections being normally interrupted, a shifter for completing said train of connections, a spring for actuating said shifter and normally tending to manipulate said shifter to its effective position, a pin-restoring finger for restoring pins set in said valuating mechanism, a shaft, a cam on said shaft, a roller on said cam engaging said pin-restoring finger, a finger on said shifter engaging said cam, and numeral-key-controlled means for effecting a rotation of said shaft to enable the concomitant actuation of said pin-restoring finger and said shifter.

8. The combination with a computing head, of valuating means for determining the numbers to be run up on said computing head, numeral keys for controlling said valuating means, and an automatic starter for said valuating means, controlled by said numeral keys and including a shaft, means for rotating said shaft, a ratchet wheel loosely mounted on said shaft, means for intermittently connecting said ratchet wheel to said shaft, a locking dog for said ratchet wheel and a tripper for said locking dog.

9. The combination with a computing head, of valuating means for determining the numbers to be run up on said computing head, numeral keys for controlling said valuating means, and an automatic starter for said valuating means, controlled by said numeral keys and including a shaft, means for rotating said shaft, a ratchet wheel loosely mounted on said shaft, a one-way clutch connection between said ratchet wheel and said shaft enabling the prevention of a rotation of said shaft from said ratchet wheel solely in one direction and means for preventing the rotation of said ratchet wheel.

10. The combination with a computing head, of valuating means for determining the running up of numbers on said computing head, numeral keys for controlling said valuating means, and an automatic starter for said valuating means, including a shaft, means for rotating said shaft, a ratchet wheel on said shaft, a dog engaging said ratchet wheel, a contact on said dog, and a tripper arranged to plunge against said contact to manipulate said dog.

11. The combination with a typewriting mechanism including a traveling carriage, of a plurality of computing heads each having a traveling element, a series of numeral keys, locks for the traveling elements of said computing heads, a lock for said traveling carriage, a lock for said keys, and means for controlling all of said locks from a common point.

12. The combination with a computing mechanism, of a series of numeral keys for controlling the action of said computing mechanism, a series of locking blades one for each of said numeral keys, brought into play at the actuation of any of said numeral keys, to prevent the actuation of the rest of said numeral keys, and a special locking blade insinuating itself automatically into an interfering position to take the place of the locking blade corresponding to the depressed numeral key when said depressed numeral key returns to its normal position, so as to prevent the actuation of the same or any other numeral key.

13. The combination with a valuating mechanism, of a series of numeral keys for controlling the action of said computing mechanism, a series of locking blades one for each of said numeral keys, brought into play at the actuation of any of said numeral keys, to prevent the actuation of the rest of said numeral keys, a special locking blade insinuating itself automatically into an interfering position to take the place of the locking blade corresponding to the depressed numeral key when said depressed numeral key returns to its normal position, so as to prevent the actuation of the same or any other numeral key, and means for controlling the action of said special locking blade from said valuating mechanism, so that said special blade may be in action when said valuating mechanism is operating.

14. The combination with a computing mechanism, of a series of numeral keys for controlling said computing mechanism, a series of interfering members individual to said numeral keys for preventing the concomitant action of more than one numeral key, and a special interfering member brought into play at the actuation of any of said numeral keys to take the place of an interfering member corresponding to a depressed numeral key after the numeral key has returned to its normal position.

15. The combination with a computing mechanism, of a series of numeral keys for controlling said computing mechanism, a series of interfering members individual to said numeral keys for preventing the concomitant action of more than one numeral key, a special interfering member brought into play at the actuation of any of said numeral keys to take the place of an interfering member corresponding to a depressed numeral key after the numeral key has returned to its normal position, and means to determine the period of effectiveness of said special interfering member to correspond with the period of action of said computing mechanism.

16. The combination with a computing mechanism, of a series of numeral keys for controlling the action of said computing mechanism, a series of interfering members one individual to each of said numeral keys for preventing the concomitant actuation of more than one of said numeral keys, a special interfering member coöperating with said first-mentioned interfering members and acting to prevent an actuation of each and all of said numeral keys, a spring normally tending to bring said special interfering member into play, means restraining said spring from action, and means released by the actuation of any of said numeral keys to enable the actuation of said spring to tend to shift said special interfering member to an interfering position subsequent to the bringing of the interfering member corresponding to the depressed numeral key into an interfering position.

17. The combination with a computing mechanism, of a series of numeral keys for controlling the action of said computing mechanism, a series of interfering members one individual to each of said numeral keys for preventing the concomitant actuation of more than one of said numeral keys, a special interfering member coöperating with said first-mentioned interfering members acting to prevent an actuation of each and all of said numeral keys, a spring normally tending to bring said special interfering member into play, means restraining said spring from action, means released by the actuation of any of said numeral keys to enable the actuation of said spring to tend to shift said special interfering member to an interfering position subsequent to the bringing of the interference member corresponding to the depressed numeral key into an interfering position, and means independent of the return movement of said numeral keys for returning said special interfering member to its normal position.

18. The combination with a computing mechanism, of a series of numeral keys for controlling the action of said computing mechanism, locking means for said numeral keys, spring means normally tending to bring said locking means into play, restraining means for preventing the bringing into play of said locking means, a tripper for releasing said restraining means, and connections enabling any of said numeral keys to actuate said tripper.

19. The combination with a computing mechanism, of a series of numeral keys for controlling the action of said computing mechanism, locking means for said numeral keys, spring means normally tending to bring said locking means into play, restraining means for preventing the bringing into play of said locking means, a tripper for releasing said restraining means, connections enabling any of said numeral keys to actuate said tripper, and controlling means independent of said numeral keys for returning said locking means to its ineffective position.

20. The combination with a computing mechanism, of a series of numeral keys for controlling the action of said computing mechanism, locking means for preventing the action of more than one numeral key at a time, brought into play at the depression of a numeral key, and locking means for preventing the actuation of said numeral keys, brought into play at the return of a depressed numeral key.

21. The combination with a valuating mechanism, of a series of numeral keys for controlling the action of said valuating mechanism, locking means for preventing the action of more than one numeral key at a time, brought in to play at the depression of a numeral key, locking means for preventing the actuation of said numeral keys, brought into play at the return of a depressed numeral key, and means for controlling said last-mentioned locking means from said valuating mechanism.

22. The combination with a computing mechanism, of a series of keys for controlling the action of said computing mechanism, a series of pivotally-mounted blades arranged to swing across a common center to interfere one with the passage of the other, so as to prevent the depression of more than one key at a time, a supplementary locking blade arranged to swing across the same center as the other locking blades, so as to prevent the actuation of any numeral key, a spring normally tending to bring said supplementary locking blade into play, a lever for restraining said spring, shifting means for said lever, restraining means for said shifting means, and tripping means actuated by said numeral keys for releasing said restraining means.

23. The combination with a computing mechanism, of a motor for driving said computing mechanism, a series of numeral keys for controlling the action of said computing mechanism, a switch for completing the circuit to said motor, said switch comprising a pair of spring contacts normally out of engagement with each other, a roller bearing against one of said spring contacts to flex the same and close said switch, a lever forming a mounting for said roller and adapted to actuate the same, a link connected to said lever, means for drawing on said link, restraining means for said last-mentioned means, and numeral key-controlled tripping means for releasing said restraining means.

24. The combination with a computing mechanism, of numeral keys for controlling the action of said computing mechanism, a motor for driving said computing mechanism, said motor being normally silent, a switch closing the circuit to said motor to incite the same to action, a roller engaging one of the parts of said switch for closing the same, a lever forming a mounting for said roller, a link for rocking said lever, a source of power for drawing on said link to close said switch, and positive means operated from said motor at the completion of a computing action by said mechanism, for enabling the rocking of said lever in the opposite direction to enable the opening of said switch.

25. The combination with computing mechanism, of a valuating wheel having a series of pins settable thereon to determine the extent of running up of numbers on said computing mechanism, a series of keys for selecting the pins to be set, automatic means tending to set up selected pins, restraining means for said automatic means, and tripping means actuated by said numeral keys for releasing said restraining means.

26. The combination with a valuating mechanism including a series of pins settable from an ineffective position to a computation-determining position, of a series of interponents normally in ineffective position, numeral keys for shifting said interponents to effective positions, and an actuator for plunging effectively located interponents against said pins to set the latter to computation-determining position.

27. The combination with a valuating mechanism including a series of pins settable from an ineffective position to a computation-determining position, of a series of interponents normally in ineffective position, numeral keys for shifting said interponents to effective positions, an actuator for plunging effectively located interponents against said pins to set the latter to computation-determining position, and a source of power other than said numeral keys for driving said actuator.

28. The combination with a valuating mechanism including a pin settable from an ineffective position to a computation-determining position, an interponent normally located in an ineffective position, a numeral key for shifting said interponent to an effective position, and an actuator for striking said interponent to set said pin after said interponent has been shifted to an effective position.

29. The combination with a valuating mechanism including a pin settable to determine a computation, of an interponent for setting said pin, a selector having a pin-and-slot connection with said interponent, an actuator for forwarding said interponent, said interponent being normally clear of said actuator, and a numeral key connected to said selector to enable the same to shift said interponent into the sphere of control by said actuator.

30. The combination with a pin settable to determine the extent of a computation, of an interponent for setting said pin, said interponent having a slot therein, a selector having a pin engaging said slot, an actuator engaging said interponent to move the same to set said pin, said interponent being normally clear of said actuator, a numeral key, and connections from said numeral key to said selector enabling said numeral key at the depression thereof, to shift said interponent through the intermediary of said selector, from a position clear of said actuator to a position in the sphere of control of said actuator.

31. The combination with a pin settable to determine a computation, of an interponent for setting said pin, an ear on said interponent, an actuator for shifting said interponent by engagement with said ear, so as to set said pin, said ear being normally clear of said actuator, a selector for shifting said interponent to a position with said ear in the path of movement of said actuator, and a key connected to manipulate said selector and thus said interponent.

32. The combination with a pin settable to determine a computation, of an interponent for setting said pin, an ear on said interponent, an actuator for shifting said interponent by engagement with said ear, so as to set said pin, said ear being normally clear of said actuator, a selector for shifting said interponent to a position with said ear in the path of movement of said actuator, a key connected to manipulate said selector and thus said interponent, and a source of power other than said key for driving said actuator.

33. The combination with a pin settable to determine a computation, of an interponent for setting said pin, an ear on said interponent, an actuator for shifting said interponent by engagement with said ear, so as to set said pin, said ear being normally clear of said actuator, a selector for shifting said interponent to a position with said ear in the path of movement of said actuator, a key connected to manipulate said selector and thus said interponent, a source of power other than said key for driving said actuator, and means controlled from said key for bringing said source of power into play to drive said actuator.

34. The combination with a wheel having a series of pins settable thereon to determine the extent of a computation, a series of interponents for setting said pins, an actuator common to all of said interponents, selectors individual to each of said interponents for determining which of said interponents shall be driven by said actuator, and numeral keys individual to said selectors and connected to shift the same to determine the interponent to be actuated.

35. The combination with a wheel having a series of pins settable thereon to determine the extent of a computation, a series of interponents for setting said pins, an actuator common to all of said interponents, selectors individual to each of said interponents for determining which of said interponents shall be driven by said actuator, numeral keys individual to said selector, connected to shift the same to determine the interponent to be actuated, and locking means brought into play at the actuation of any numeral keys, so as to prevent the selection of more than one interponent to be driven by said actuator at a time.

36. The combination with a valuating wheel having a series of pins settable thereon to determine the extent of computation, of a series of interponents for setting said pins, said interponents being floatingly mounted, a common striker for actuating any of said interponents, to set up the apposite pin, a series of selectors, one individual to each of said interponents for shifting the same from a normally ineffective position to an effective position, and a series of numeral keys for shifting said selectors to determine the effectiveness of the corresponding interponents.

37. The combination with a wheel having a series of pins settable to determine the extent of computation, a series of interponents for setting said pins, an actuator for driving said interponents, and numeral-key-controlled means for determining which of said interponents shall be driven by said actuator, said actuator comprising a pair of spaced rings engaging said interponents to move the same in opposite directions.

38. The combination with a valuating wheel having a series of pins settable to determine the extent of a computation, of a series of interponents for setting said pins, and an actuator for driving said interponents to set said pins, said actuator comprising a pair of spaced rings, said interponents having ears to engage one of said rings and shoulders to engage the other of said rings, so that said rings can individually move said interponents in opposite directions.

39. The combination with a valuating wheel having a series of pins settable to determine the extent of a computation, of a series of interponents for setting said pins, an actuator common to all of said interponents for driving the same, and a source of power for reciprocating said actuator.

40. The combination with a valuating wheel having a series of pins settable to determine the extent of a computation, of a series of interponents for setting said pins, an actuator common to all of said interponents for manipulating said interponents to set said pins, and means for operating said actuator.

41. The combination with a valuating wheel having a series of pins settable to determine the extent of a computation, of a series of interponents for setting said pins, a series of numeral keys for determining the interponents to be actuated to set the accordant pin, and a striker for hitting said interponents after having been selected by said keys to set said pins.

42. The combination with a valuating wheel having a series of pins settable thereon to determine the extent of a computation, a series of members for setting said pins, and a spring individual to each of said members, permitting the unset pins during a subsequent rotation of said wheel to cam aside the particular pin-setting member used to set a pin when in its setting position, so as to prevent said member interfering with the rotation of said wheel.

43. The combination with a valuating wheel having a series of pins settable to determine the extent of rotation of said wheel and thus the extent of computation, of a series of members for setting the several pins of said wheel, a guiding spider for said members having tangentially-disposed guiding slots through which said members extend, spring means enabling said members to move tangentially out of the path of unset pins during a rotation of said wheel subsequent to the setting of a pin by one of said members, so that any of said members used to set a pin and remaining in its setting position, will be cammed aside tangentially out of the way of the unset pins, so as to avoid interfering with the rotation of said wheel.

44. The combination with a computing mechanism, of numeral keys for controlling the action of said computing mechanism, means to enable the return of said numeral keys after having been depressed to start a computing action, at any time before or after the computing action has been completed, and locking means for preventing the subsequent actuation of another or the same numeral key just actuated, until the computing action started thereby has been completed.

45. The combination with a valuating wheel having a plurality of pins settable to determine the extent of rotation of said wheel and thus the extent of a computation, a series of members for setting said pins by plunging against the same, a guiding spider for said member having tangentially-arranged slots permitting a movement of said members tangentially toward the axial center of said wheel, to enable the unset pins to cam aside in a tangential direction any member used to set a pin and remaining in its set position, and individual springs for each of said members arranged to return said members to a normal position after a camming action by said pins.

46. The combination with a valuating wheel having a series of pins settable to determine the extent of rotation of said wheel and thus the extent of a computation, of a series of members for setting said pins, each of said members having a bladed head bent to form a cam surface, whereby the unset pins may cam aside any of said members used to set a pin and remaining in its set position.

47. The combination with a valuating wheel having a series of pins settable to determine the extent of rotation of said wheel and thus the extent of a computation, of a series of members for setting said pins, each of said members having a bladed head bent to form a cam surface, whereby the unset pins may cam aside any of said members used to set a pin and remaining in its set position, and guiding means for said members enabling a camming movement of said members by the unset pins toward the center of said wheel in the direction other than radial.

48. The combination with a series of pins settable to determine the extent of computation, a source of power for setting said pins, numeral keys for controlling the action of said source of power to set said pins, and a single member actuable by each and all of said numeral keys for bringing said source of power into action to set said pins.

49. The combination with a computing mechanism, of numeral keys for controlling the action of said computing mechanism, a member common to all of said numeral keys and through which each of said numeral keys controls the action of said computing mechanism, controlling means for determining the effectiveness of said member, to bring said computing mechanism into play and thus control the effectiveness of said keys to govern the action of said computing mechanism, and manual means for shifting said controlling means to render said numeral keys effective or ineffective to control the action of said computing mechanism at will.

50. The combination with a computing mechanism, of numeral keys for controlling the action of said computing mechanism, a member common to all of said numeral keys and through which each of said numeral keys controls the action of said computing mechanism, controlling means for determining the effectiveness of said member to bring said computing mechanism into play and thus control the effectiveness of said keys to govern the action of said computing mechanism, a traveling carriage, and carriage-controlled means for shifting said controlling means as said carriage enters a computing zone to determine automatically the effectiveness of said numeral keys to bring into play said computing mechanism during the passage of said carriage through said zone.

51. The combination with a computing mechanism, of numeral keys for controlling the action of said computing mechanism, a member common to all of said numeral keys and through which each of said numeral keys controls the action of said computing mechanism, controlling means for determining the effectiveness of said member, to bring said computing mechanism into play and thus control the effectiveness of said keys to govern the action of said computing mechanism, and automatic means for adjusting said controlling means to determine the effective and ineffective positions of said member and thus determine automatically the ability of said numeral keys to control the action of said computing mechanism.

52. The combination with a computing mechanism, of numeral keys for controlling the action of said computing mechanism, a member common to all of said numeral keys and through which each of said numeral keys controls the action of said computing mechanism, controlling means for determining the effectiveness of said member, to bring said computing mechanism into play and thus control the effectiveness of said keys to govern the action of said computing mechanism, and automatic means for intermittently shifting said controlling means so as to move said member to its effective position, thereby determining computation zones in which said numeral keys may control the action of said computing mechanism.

53. The combination with a computing mechanism, of numeral keys for controlling the action of said computing mechanism, a single member common to all of said numeral keys and through which all of said numeral keys act to control the action of said computing mechanism, said member being movable to an ineffective position so that said numeral keys will be incapable of controlling the action of said computing mechanism, a carriage, and carriage-controlled means for repeatedly shifting said member between effective and ineffective positions, so as to determine, during the travel of said carriage, computing zones solely during which said numeral keys will be effective to control the action of said computing mechanism.

54. The combination with a computing mechanism, of numeral keys for controlling the action of said computing mechanism, a member common to all of said numeral keys and through which each of said numeral keys controls the action of said computing mechanism, controlling means for determining the effectiveness of said member, to bring said computing mechanism into play and thus control the effectiveness of said keys to govern the action of said computing mechanism, automatic means for governing the position of said controlling means to determine the effectiveness of said numeral keys to control said computing mechanism, and manual means for determining the position of said controlling means so as to determine the effectiveness of said numeral keys to control the action of said computing mechanism.

55. The combination with a computing mechanism, of numeral keys for controlling the action of said computing mechanism, a member common to all of said numeral keys and through which each of said computing keys controls the action of said computing mechanism, controlling means for determining the effectiveness of said member, to bring said computing mechanism into play and thus control the effectiveness of said keys to govern the action of said computing mechanism, automatic means for determining the effective and ineffective positions of said member by adjusting said controlling means, and manual means for governing the effectiveness of said automatic means to adjust said controlling means.

56. The combination with a computing mechanism, of numeral keys for controlling the action of said computing mechanism, a member common to all of said numeral keys and through which each of said numeral keys controls the action of said computing mechanism, controlling means for determining the effectiveness of said member, to bring said computing mechanism into play and thus control the effectiveness of said keys to govern the action of said computing mechanism, automatic means for determining the effective and ineffective positions of said member by adjusting said controlling means, and means for silencing said automatic means.

57. The combination with a computing mechanism, of a series of numeral keys for controlling the action of said computing mechanism, connections between said numeral keys and said computing mechanism, automatic means for interrupting said connections at a point other than at said numeral keys, so as to incapacitate said numeral keys to control the action of said computing mechanism, and manual means for controlling the effectiveness of said automatic means.

58. The combination with a computing mechanism, of restraining means for preventing the action of said computing mechanism, numeral keys for controlling the action of said computing mechanism, a tripper actuated by said numeral keys to release said restraining means, and a deflector for shifting said tripper to a position out of the way, enabling the return of the parts actuated by said tripper, even while the numeral key actuating said tripper remains in its depressed position.

59. The combination with a computing mechanism, of numeral keys for controlling the action of said computing mechanism, a member common to all of said numeral keys and actuated by any one thereof to control the action of said computing mechanism, and means for shifting said member to an ineffective position after the start of a computing action, thereby to prevent a repeated effective action of said member while the computing action is going on.

60. The combination with a computing mechanism, of numeral keys for controlling the action of said computing mechanism, restraining means for preventing the action of said computing mechanism, a tripper actuable by any of said numeral keys, to release said restraining means, and a deflector for shifting said tripper to an ineffective position after the start of a computing action and during the progress thereof, so as to prevent a repeated effective action of said tripper during a single computation of said computing mechanism.

61. The combination with a computing mechanism, of a series of numeral keys for controlling the action of said computing mechanism, a single member actuated by any of said numeral keys for enabling the control of said computing mechanism from said numeral keys, automatic means for determining the effective and ineffective positions of said member at a point outside of the computing mechanism, and automatic means controlled from said computing mechanism for determining the effective and ineffective positions of said member, so as to prevent the piling of a new computing action on top of the computing action under way.

62. The combination with a computing mechanism, of a series of numeral keys for controlling the action of said computing mechanism, connections between said numeral keys and said computing mechanism to enable the control of said computing mechanism by said numeral keys, and automatically-acting means for interrupting said connections at the start of each computation, so as to prevent the piling of a new computation on top of the computation under way before the latter is finished.

63. The combination with a computing mechanism, of a series of numeral keys for controlling the action of said computing mechanism, a train of connections between said numeral keys and said computing mechanism, enabling the control of said computing mechanism by said numeral keys, and automatic means acting at the incitation of said computing mechanism by a numeral key to start a computing action, to interrupt said train of connections so as to render said numeral keys incapable of starting a new computing action until the computing action under way is completed and also acting automatically to complete said train of connections at the completion of the computing action, so that a new computation can be started after the one under way has been finished.

64. The combination with a computing mechanism, of numeral keys for controlling the action of said computing mechanism, a tripper actuated by any of said numeral keys for enabling a computing action of said computing mechanism, a shifter for said tripper, a control for said shifter tending to move said tripper to an ineffective position, and automatic means acting on said control to move said shifter to a position corresponding to an effective position of said tripper.

65. The combination with a typewriting mechanism including a traveling carriage, of a computing mechanism, numeral keys for controlling the movement of said carriage and the action of said computing mechanism, a tripper actuated by any of said numeral keys for governing the action of said computing mechanism, a shifter for said tripper for determining the ineffective and effective positions thereof, a control normally tending to move said tripper through said shifter to an ineffective position, and automatic means operated from said carriage for overcoming the tendency of said control at different points corresponding to computing zones, so as to move said tripper to its effective position.

66. The combination with a typewriting mechanism including a traveling carriage, of a computing mechanism, numeral keys for controlling the movement of said carriage and the action of said computing mechanism, a tripper actuated by any of said numeral keys for governing the action of said computing mechanism, a shifter for said tripper for determining the ineffective and effective positions thereof, a control normally tending to move said tripper through said shifter to an ineffective position, and automatic means operated from said carriage for overcoming the tendency of said control at different points corresponding to computing zones, so as to move said tripper to its effective position, said control being adjustable so as to be independent of control by said automatic means.

67. The combination with a computing mechanism, of numeral keys for controlling the action of said computing mechanism, a shifter having an opening therein, and a tripper extending through said opening so that said shifter can manipulate the same between effective and ineffective positions, said tripper being actuable by any of said numeral keys to slide through said opening, so as to incite said computing mechanism to action.

68. The combination with a computing mechanism, of numeral keys for controlling the action of said computing mechanism, a source of power brought into play by said numeral keys for starting a computing action, a shaft connected to be actuated by said source of power, a ratchet wheel on said shaft, a dog engaging said ratchet wheel to restrain the action of said source of power, and a tripper for releasing said dog actuable by any of said numeral keys.

69. The combination with a computing mechanism, of numeral keys for controlling the action of said computing mechanism, a source of power brought into play by said numeral keys for starting a computing action, a shaft connected to be actuated by said source of power, a ratchet wheel on said shaft, a dog engaging said ratchet wheel to restrain the action of said source of power, a tripper for releasing said dog actuable by any of said numeral keys, and shifting means for determining the effectiveness of said tripper to release said dog.

70. The combination with valuating mechanism, including a series of pins settable to determine the extent of computation, of interponents for setting said pins, selectors for determining which of said interponents shall be actuated, numeral keys connected to operate corresponding selectors, a hub operated when any one of said numeral keys is actuated, a lever connected to be rocked by said hub, an actuator for said interponents, a source of power for driving said actuator, restraining means for preventing the driving of said actuator by said source of power, and a tripper connected to said lever to be actuated thereby, so as to release said restraining means and enable the driving of said actuator after an interponent has been shifted to an effective position by the corresponding numeral key through the intermediary of its selector.

71. The combination with a computing mechanism, of numeral keys for controlling the action of said computing mechanism, a tripper actuated by any of said numeral keys to bring said computing mechanism into play, a spring normally tending to move said tripper to an ineffective position, and means for overcoming the tendency of said spring.

72. The combination with a computing mechanism, of numeral keys for controlling the action of said computing mechanism, a tripper actuated by any of said numeral keys to bring said computing mechanism into play, a spring normally tending to move said tripper to an effective position, a stronger spring overcoming the tendency of said first-mentioned spring, and means for overcoming the tension on said stronger spring, so as to permit said first-mentioned spring to act.

73. The combination with a computing mechanism, of a series of numeral keys for controlling the action of said computing mechanism, a tripper actuable by any of said numeral keys for moving said computing mechanism into play, a spring tending to move said tripper to its effective position, and means for adjusting the direction of pull of said spring, so that it will tend to move said tripper to its ineffective position.

74. The combination with a computing mechanism, of a set of numeral keys for controlling the action of said computing mechanism, a tripper actuable by any of said numeral keys to move said computing mechanism into play, a spring controlling the ineffective position of said tripper according to the direction of pull thereon, and means for changing the direction of pull of said spring.

75. The combination with a valuating mechanism including a pin settable from an ineffective position to a computation-determining position, of an interponent for setting said pin, said interponent normally located in an ineffective position, a numeral key for shifting said interponent to an effective position, and actuating means other than said numeral key, brought in play by said numeral key for reciprocating said interponent to set said pin at the depression of said key.

76. The combination with a carriage, of a computing mechanism, a series of numeral keys for controlling the action of said computing mechanism, connections between all said numeral keys and said computing mechanism, means for breaking at a single point the connections between all said numeral keys and said computing mechanism, and means for controlling said last-mentioned means from said carriage.

77. In a combined typewriting and computing machine, the combination with typewriting mechanism including a traveling carriage, of computing mechanism, a bellcrank for locking said carriage against movement during the movement of said computing mechanism to compute a number, a spring engaging said bell-crank normally tending to move said bell-crank to its effective locking position, and power means for initiating a computation and permitting said spring to act.

78. In a combined typewriting and computing machine, the combination with typewriting mechanism including a traveling carriage, of computing mechanism, a bellcrank lever for locking said carriage against movement during movement of said computing mechanism to compute a number, a spring engaging said bell-crank lever normally tending to move said lever to its effective locking position, a cam engaging said lever normally overcoming the tendency of said spring to move said lever to effective position, and power means for initiating a computation and moving said cam to release said spring.

79. In a computing machine, the combination with computing mechanism, said mechanism including a valuating wheel having a series of index pins settable thereon to determine the extent of rotation thereof, of primary power mechanism for actuating said computing mechanism, said power mechanism being normally disconnected from said computing mechanism, auxiliary power mechanism for connecting said primary power mechanism to said computing mechanism, means for restoring power to said auxiliary power mechanism including a driving element, a driven element, a normally-interrupted clutch-connection between said driving and said driven elements, a clutch-closer for effecting a driving relation between said driven and said driving elements, and a shifter for said clutch-closer, said shifter being formed so as to be rocked in one direction by normally disposed pins and to be rocked in the opposite direction to effect a closing of said connection by a set pin.

80. In a computing machine, the combination with computing mechanism, said mechanism including a valuating wheel having a series of index pins settable thereon from a position projecting on one side of the wheel to a position projecting on the other side of the wheel, of primary power mechanism, said power mechanism being normally disconnected from said computing mechanism, auxiliary power mechanism for controlling the connection of said primary power mechanism and said computing mechanism, and means for restoring power to said auxiliary power mechanism, said means including a normally-interrupted driving train and a shifter for the completion of said train, said shifter having an arm extending to engage with said pins when projected on one side of said valuating wheel, and another arm extending to engage said pins when projected on the opposite side of said wheel.

81. In a computing machine, the combination with computing mechanism, said mechanism including a valuating wheel having a series of index pins settable thereon from a position projecting on one side of the wheel to a position projecting on the other side of the wheel, of primary power mechanism, said power mechanism being normally disconnected from said computing mechanism, auxiliary power mechanism for controlling the connection of said primary power mechanism and said computing mechanism, and means for restoring power to said auxiliary power mechanism, said means including a normally-interrupted driving train and a shifter for the completion of said train, said shifter having an arm extending to engage with said pins when projected on one side of said valuating wheel, and another arm extending to engage said pins when projected on the opposite side of said wheel, said pins acting to rock said shifter during the rotation of said wheel.

82. In a computing machine, the combination with computing mechanism, of indexing devices for determining the amount of movement of said computing mechanism, means for actuating said indexing devices, numeral keys for positioning said actuating means, and power means for moving any positioned actuating means to set an indexing device.

83. In a computing machine, the combination with a valuating wheel having a series of pins settable to determine the extent of a computation, of pin-setting mechanism comprising a series of interponents, an actuator for said interponents, and means for bringing solely a single interponent at a time into the sphere of action of said actuator, so as to be operated thereby.

84. In a computing machine, the combination with a valuating wheel having a series of pins settable to determine the extent of a computation, of a pin-setting mechanism comprising a series of interponents, a striker common to all of said interponents for actuating the same, a spring for moving said striker in one direction, and a spring for returning said striker, one of said springs being stronger than the other.

85. In a computing machine, the combination with computing mechanism and a valuating wheel having a series of pins settable to determine the extent of a computation, of a pin-setting mechanism comprising a series of interponents, a striker common to all of said interponents for actuating the same, a spring for moving said striker in one direction, a spring for returning said striker, one of said springs being stronger than the other, and means for overcoming the tension of the stronger of said springs to enable a movement of said striker by the weaker of said springs.

GUSTAVE O. DEGENER.

Witnesses:
D. L. BAYLIS,
S. J. PUTNAM.

Copies of this patent may be obtained for five cents each, by addressing the "Commissioner of Patents, Washington, D. C."